(12) United States Patent
Mahanthappa et al.

(10) Patent No.: US 9,376,523 B2
(45) Date of Patent: *Jun. 28, 2016

(54) POLY(VINYL ALCOHOL)-POLY(VINYL ESTER) BLOCK COPOLYMERS

(75) Inventors: Mahesh Kalyana Mahanthappa, Madison, WI (US); Corinne Elizabeth Lipscomb, St. Paul, MN (US); Milton Repollet-Pedrosa, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 739 days.

This patent is subject to a terminal disclaimer.

(21) Appl. No.: 13/638,464

(22) PCT Filed: Sep. 2, 2010

(86) PCT No.: PCT/US2010/047704
§ 371 (c)(1),
(2), (4) Date: Aug. 19, 2013

(87) PCT Pub. No.: WO2011/115641
PCT Pub. Date: Sep. 22, 2011

(65) Prior Publication Data
US 2015/0307645 A1    Oct. 29, 2015

Related U.S. Application Data

(60) Provisional application No. 61/315,787, filed on Mar. 19, 2010.

(51) Int. Cl.
*C08L 53/00* (2006.01)
*C08F 293/00* (2006.01)
*C08F 299/04* (2006.01)
*C08K 5/05* (2006.01)
*C08K 5/20* (2006.01)
*C08K 5/3415* (2006.01)
*C08K 5/41* (2006.01)

(52) U.S. Cl.
CPC ............ *C08F 299/04* (2013.01); *C08F 293/005* (2013.01); *C08F 299/0407* (2013.01); *C08K 5/05* (2013.01); *C08K 5/20* (2013.01); *C08K 5/3415* (2013.01); *C08K 5/41* (2013.01); *C08L 53/00* (2013.01)

(58) Field of Classification Search
CPC ........................... C08F 293/00; C08F 293/005
See application file for complete search history.

(56) References Cited

U.S. PATENT DOCUMENTS

| | | | |
|---|---|---|---|
| 6,642,318 B1 | 11/2003 | Chiefari et al. | |
| 6,747,111 B2 | 6/2004 | Chiefari et al. | |
| 7,682,626 B2 | 3/2010 | Rozema et al. | |
| 2011/0224377 A1* | 9/2011 | Mahanthappa | C08F 293/005 525/200 |

FOREIGN PATENT DOCUMENTS

| | | |
|---|---|---|
| CN | 101544713 A | 9/2009 |
| EP | 0450317 A1 | 10/1991 |
| JP | 2007246639 A | 9/2007 |

OTHER PUBLICATIONS

Debuigne et al.; "Overview of Cobalt-Mediated Radical Polymerization: Roots, State of the Art and Future Prospects"; Progress in Polymer Science; 34(3); pp. 211-239; (2009).
International Preliminary Report on Patentability and Written Opinion; International Appliction No. PCT/US2010/047704; International Filing Date Sep. 2, 2010; Date of Mailing Oct. 4, 2012; 7 pages.
International Search Report; International Application No. PCT/US2010/047704; International Filing Date Sep. 2, 2010; Date of Mailing Nov. 22, 2010; 3 pages.
Lipscomb et al.; "Poly(vinyl ester) Block Copolymers Synthesized by Reversible Addition—Fragmentation Chain Transfer Polymerizations"; Macromolecules; 42; pp. 4571-4579; (2009).
Bates, "Network Phases in Block Colpolymer Melts"; MRS Bulletin; 30; pp. 525-532; (2005).
Bunck et al.; "Cobalt-mediated radical polymerization routes to poly(vinyl ester) block copolymers"; J. Polym. Sci. Part A: Polym. Chem.; 49; pp. 242-249; (2011).
Debuigne et al.; "Highly Efficient Cobalt-Mediated Radical Polymerization of Vinyl Acetate"; Angew. Chem. Inc. Ed.; 44; pp. 1101-1104; (2005).
Jeon, et al.; "Synthesis of Poly (Vinyl Pivalate) and its lock Copolymers by Cobalt-Mediated Radical Polymerization"; Textile Sci. & Eng.; 45:6; pp. 346-352; (2008).
Lipscomb et al.; "Poly(vinyl ester) Block Copolymers from Reversible Addition Fragmentation Chain Transfer (RAFT) polymerization"; Abstracts of Papers, 238th ACS National Meeting, Washington DC, United States; Aug. 16-20, 2009 Poly-250, 2 pages.
Lipscomb et al.; "Development and Characterization of New Bioderadablel Triblock Copolymers Based on Poly(Vinyl Esters)"; American Chemical Society, Division of Polymer Chemistry; 51; pp. 233-234; (2010).
Repollet-Pedrosa et al.; "Poly(vinyl acetate-b-vinyl alcohol) Surfactant Derived from Poly(vinyl Ester) Block Copolymers"; Macromolecules; 43; pp. 7900-7902; (2010).
Stenzel et al.; "Xanthate Mediated Living Polymerization of Vinyl Acetate: A Systematic Variation in MADIX/RAFT Agent Structure"; Macromol. Chem. Phys.; 204; pp. 1160-1168; (2003).
Taton et al.; "Direct Synthesis of Double Hydrophilic Statistical Di- and Triblock Copolymers Comprised of Acrylamide and Acrylic Acid Units via the MADIX Process"; Macromol. Rapid Commun.; 22; pp. 1497-1503; (2001).

\* cited by examiner

*Primary Examiner* — Irina S Zemel
*Assistant Examiner* — Jeffrey Lenihan
(74) *Attorney, Agent, or Firm* — Cantor Colburn LLP

(57) ABSTRACT

Copolymers comprising a block of polyvinyl alcohol) and a block of a polyvinyl ester. Copolymers comprising a block of polyvinyl haloalkanoate) and a block of a polyvinyl ester). Methods of making copolymers comprising a block of poly-vinyl alcohol) and a block of a polyvinyl ester. Methods of making copolymers comprising a block of polyvinyl haloalkanoate) and a block of a polyvinyl ester). The copolymers may be incorporated into aqueous dispersions to form micelles or hydrogels. Some copolymers are biodegradable and have surfactant properties.

9 Claims, 8 Drawing Sheets

POLY(VINYL ALCOHOL)-POLY(VINYL ESTER) BLOCK COPOLYMERS

CROSS-REFERENCE TO RELATED APPLICATIONS

This application is a U.S. National Phase patent application of International Application Ser. No. PCT/US2010/47704, filed on Sep. 2, 2010, which is incorporated herein by reference in its entirety, and which claims priority to U.S. Provisional Patent Application No. 61/315,787, filed Mar. 19, 2010, which is incorporated herein by reference in its entirety.

STATEMENT REGARDING FEDERALLY FUNDED RESEARCH

This invention was made with U.S. government support under grant number DMR-0748503 awarded by the National Science Foundation. The government has certain rights in the invention.

BACKGROUND

Amphiphilic molecules, molecules containing a polar headgroup and a hydrophobic tail, dispersed in a selective solvent adopt structures that reflect a delicate balance between the interfacial energies of the solvated polar headgroup and the hydrophobic tail. The aggregation behavior of dispersed amphiphiles becomes considerably more complex as the overall surfactant molecular weight increases. Aqueous dispersions of amphiphilic block copolymers (ABCs) adopt complex morphologies as compared to conventional low molecular weight surfactants. In addition to spherical micelles, worm-like micelles, and vesicles, non-ionic macromolecular surfactants may form complex branched structures in dilute solutions. The vanishingly small critical micelle concentration, above which the surfactant molecules aggregate, kinetically traps temporally persistent ABC aggregates whose structures dramatically alter the rheological properties and wetting properties of the dispersant phase. Therefore, the utility of ABC dispersions depends critically on the ability to delicately control interfacial curvature between the hydrophilic and hydrophobic blocks using a combination of polymer composition, overall polymer molecular weight, and non-covalent interactions. By virtue of their ability to form persistent, solvated, nano-scale aggregates, macromolecular amphiphiles are widely employed as additives in personal care products, templated mesoporous materials syntheses, and in enhanced oil recovery.

Widespread non-ionic block copolymer surfactants utilize poly(ethylene oxide) (PEO) as the hydrophilic segment, however, this biocompatible polymer is not easily degraded. The development of degradable materials with the added benefit of biocompatibility and programmable degradation profiles would enable their widespread use in a variety of applications, including new materials for small molecule drug delivery, therapeutic nucleic acid delivery, tissue scaffolds with properties reminiscent of the extracellular matrix, new rheological modifiers for stabilizing emulsions, and viscoelastic surfactants for enhanced oil recovery. Poly(vinyl alcohol) is a water soluble polymer that is degradable both in the environment and under biological conditions in vivo, which is listed on the U.S. FDA "Generally Regarded as Safe" listing for use in various products fit for human consumption.

SUMMARY

In one embodiment, the invention provides a copolymer comprising a block of poly(vinyl alcohol) and a block of a polyvinyl ester, the block of polyvinyl ester comprising repeating units of:

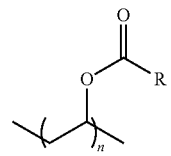

wherein R is H, $C_1$-$C_{22}$ straight or branched alkyl or alkylhalide, or phenyl or substituted phenyl, and n is 10 to 12,000. The block of polyvinyl ester may comprise repeating units selected from the group consisting of vinyl acetate (VAc), vinyl pivalate (VPv), vinyl benzoate (VBz), vinyl propionate (VPr), vinyl butyrate (VBut), vinyl stearate (VSt), vinyl chloroacetate (VClAc), vinyl dichloroacetate, vinyl trichloroacetate, vinyl fluoroacetate, vinyl difluoroacetate, vinyl trifluoroacetate, and vinyl 2-chloropropionate. The block copolymers comprise at least two blocks of different repeating units. The block copolymers may comprise three, or four, or five, or six, or seven, or eight, or nine, or ten, or eleven, or twelve, or more blocks of repeating units. The block copolymers may be branched, or linear, or star-shaped.

In another embodiment, the invention provides copolymers comprising a block of poly(vinyl alcohol) and a block of a polyvinyl ester that may be incorporated into aqueous dispersions to form micelles or hydrogels. The dispersion may further comprise a solvent selected from the group consisting of methanol, ethanol, n-propanol, isopropanol, n-butanol, isobutanol, t-butanol, dimethylsulfoxide, dimethylformamide, and N-methyl pyrrolidone.

In another embodiment, the invention provides a copolymer comprising a block of polyvinyl haloalkanoate and a block of a polyvinyl ester, the block of polyvinyl haloalkanoate comprising repeating units of:

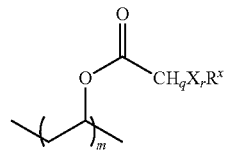

wherein X is fluorine or chlorine, q is 0 or 1, r is 2−q, $R^x$ is H, Cl, F, $CH_3$ or $(CH_2)_tCH_3$, t is 1 is 16, and m is 10 to 12,000; and the block of polyvinyl ester comprises repeating units of:

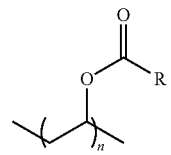

wherein R is H, $C_1$-$C_{22}$ straight or branched alkyl or alkylhalide, or phenyl or substituted phenyl, and n is 10 to 12,000, provided the repeating polyvinyl haloalkanoate units are not the same as the polyvinyl ester units. The block of polyvinyl ester may comprise repeating units selected from the group consisting of vinyl acetate (VAc), vinyl pivalate (VPv), vinyl benzoate (VBz), vinyl propionate (VPr), vinyl butyrate (VBut), vinyl stearate (VSt), vinyl chloroacetate (VClAc), vinyl dichloroacetate, vinyl trichloroacetate, vinyl fluoroacetate, vinyl difluoroacetate, vinyl trifluoroacetate, and vinyl 2-chloropropionate. The block copolymers comprise at least two blocks of different repeating units. The block copolymers may comprise three, or four, or five, or six, or seven, or eight, or nine, or ten, or eleven, or twelve, or more blocks of repeating units. The block copolymers may be branched, or linear, or star-shaped.

In another embodiment, the invention provides a method of making a poly(vinyl ester)-b-poly(vinyl alcohol) copolymer comprising contacting vinyl haloalkanoate monomers, with:

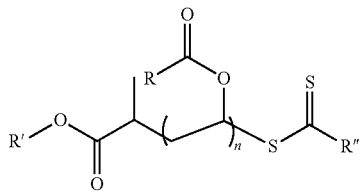

wherein R is H, $C_1$-$C_{22}$ straight or branched alkyl or alkylhalide, or phenyl or substituted phenyl, provided R is not $CH_qX_rR^x$, R' is $C_1$-$C_6$ branched or straight-chain alkane, R" is $C_1$-$C_4$ alkoxy, phenoxy or substituted phenoxy, or $NR'''_2$ wherein R''' is phenyl or substituted phenyl, and n is 10 to 12,000, forming a poly(vinyl ester)-b-poly(vinyl haloalkanoate) block copolymer, hydrolyzing at least a portion of the haloalkanoate units of the poly(vinyl ester)-b-poly(vinyl haloalkanoate) block copolymer in the presence of a Bronsted base or Lewis base, and forming a poly(vinyl ester)-b-poly(vinyl alcohol) block copolymer. The block of polyvinyl ester may comprise repeating units selected from the group consisting of vinyl acetate (VAc), vinyl pivalate (VPv), vinyl benzoate (VBz), vinyl propionate (VPr), vinyl butyrate (VBut), vinyl stearate (VSt), vinyl chloroacetate (VClAc), vinyl dichloroacetate, vinyl trichloroacetate, vinyl fluoroacetate, vinyl fluoroacetate, vinyl trifluoroacetate, and vinyl 2-chloropropionate.

In another embodiment, the invention provides a method of making a poly(vinyl alcohol)-b-poly(vinyl ester) copolymer comprising contacting vinyl ester monomers with:

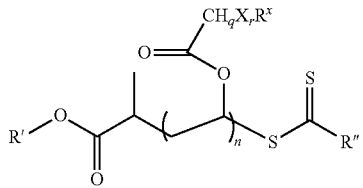

wherein R' is $C_1$-$C_6$ branched or straight-chain alkane, R" is $C_1$-$C_4$ alkoxy, phenoxy or substituted phenoxy, or $NR'''_2$ wherein R''' is phenyl or substituted phenyl, X is fluoro or chloro, q is 0 or 1, r is 2-q, $R^x$ is H, F, Cl, $CH_3$ or $(CH_2)_tCH_3$, t is 1 to 16, and n is 10 to 12,000, forming a poly(vinyl haloalkanoate)-b-poly(vinyl ester) block copolymer, hydrolyzing at least a portion of the haloalkanoate units of the poly(vinyl haloalkanoate)-b-poly(vinyl ester) block copolymer in the presence of a Bronsted base or Lewis base, and forming a poly(vinyl alcohol)-b-poly(vinyl ester) block copolymer. The vinyl ester monomers may be of:

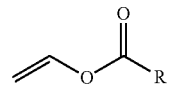

wherein R is H, $C_1$-$C_{22}$ straight or branched alkyl or alkylhalide, or phenyl or substituted phenyl, provided R is not $CH_qX_rR^x$. In some embodiments, the vinyl ester monomers may be vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate and vinyl trifluoroacetate.

In another embodiment, the invention provides a method of making a poly(vinyl alcohol)-b-poly(vinyl ester)-b-poly(vinyl alcohol) multiblock copolymer comprising contacting vinyl haloalkanoate monomers with:

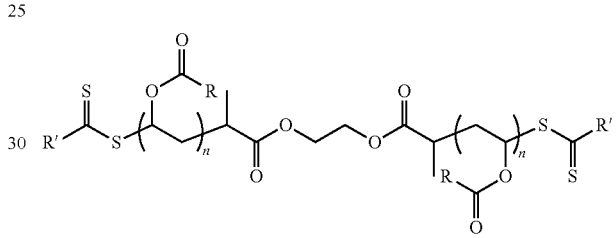

wherein R is H, $C_1$-$C_{22}$ straight or branched alkyl or alkylhalide, or phenyl or substituted phenyl, R' is $C_1$-$C_4$ alkoxy, phenoxy or substituted phenoxy, or $NR''_2$ wherein R" is phenyl or substituted phenyl, and n is 10 to 12,000, forming a poly(vinyl haloalkanoate)-b-poly(vinyl ester)-b-poly(vinyl haloroacetate) multiblock copolymer, hydrolyzing at least a portion of the haloalkanoate units of the poly(vinyl haloalkanoate)-b-poly(vinyl ester)-b-poly(vinyl haloalkanoate) multiblock copolymer in the presence of a Bronsted base or Lewis base, and forming a poly(vinyl alcohol)-b-poly(vinyl ester)-b-poly(vinyl alcohol) multiblock copolymer.

In another embodiment, the invention provides a method of making a poly(vinyl ester)-b-poly(vinyl alcohol)-b-poly(vinyl ester) multiblock copolymer comprising contacting vinyl ester monomers with:

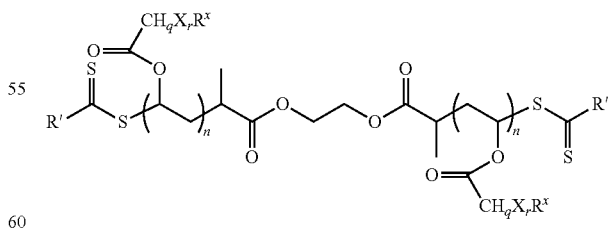

wherein R' is $C_1$-$C_4$ alkoxy, phenoxy or substituted phenoxy, or $NR_2''$ wherein R" is phenyl or substituted phenyl, X is fluoro or chloro, q is 0 or 1, r is 2-q, $R^x$ is H, F, Cl, $CH_3$ or $(CH_2)_tCH_3$, t is 1 to 16, and n is 10 to 12,000, forming a poly(vinyl ester)-b-poly(vinyl haloalkanoate)-b-poly(vinyl ester) multiblock copolymer, hydrolyzing at least a portion of the haloalkanoate units of the poly(vinyl ester)-b-poly(vinyl haloalkanoate)-b-poly(vinyl ester) multiblock copolymer in the presence of a Bronsted base or Lewis base, and forming a poly(vinyl ester)-b-poly(vinyl alcohol)-b-poly(vinyl ester) multiblock copolymer. The vinyl ester monomers may be of:

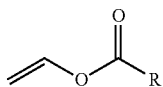

wherein R is H, $C_1$-$C_{22}$ straight or branched alkyl or alkylhalide, or phenyl or substituted phenyl, provided R is not $CH_qX_rR^x$. In some embodiments, the vinyl ester monomers may be vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, or vinyl trifluoroacetate.

In another embodiment, the invention provides a method of making a poly(vinyl ester)-b-poly(vinyl alcohol) copolymer comprising contacting vinyl ester monomers with cobalt(II) acetylacetonate, an organic peroxide, an inorganic peroxide, or an organic diazo compound, and a reducing agent to make a vinyl ester monomer mixture, heating the vinyl ester monomer mixture to make a cobalt end-capped vinyl ester polymer, cooling the cobalt end-capped vinyl ester polymer, contacting the cobalt-end capped vinyl ester polymer with vinyl haloalkanoate monomers to make a cobalt end-capped vinyl ester polymer-vinyl haloalkanoate monomer mixture, heating the vinyl ester polymer-vinyl haloalkanoate monomer mixture to make a vinyl ester-block-vinyl haloalkanoate copolymer, and hydrolyzing at least a portion of the haloalkanoate units of the vinyl ester-block-vinyl haloalkanoate copolymer in the presence of a Bronsted base or Lewis base to form a poly(vinyl ester)-b-poly(vinyl alcohol) copolymer. The vinyl ester monomers may be vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, vinyl trifluoroacetate, or vinyl 2-chloropropionate.

In another embodiment, the invention provides a method of making a poly(vinyl ester)-b-poly(vinyl alcohol) block copolymer comprising contacting vinyl ester monomers with an organobismuthine and an organic peroxide, an inorganic peroxide, or an organic diazo compound to make a vinyl ester monomer mixture, heating the vinyl ester monomer mixture to make a bismuth end-capped vinyl ester polymer, cooling the bismuth end-capped vinyl ester polymer, contacting the bismuth end-capped vinyl ester polymer with vinyl haloalkanoate monomers to make a bismuth end-capped vinyl ester polymer-vinyl haloalkanoate monomer mixture, heating the bismuth end-capped vinyl ester polymer-vinyl haloalkanoate monomer mixture to make a vinyl ester-block-vinyl haloalkanoate copolymer, and hydrolyzing at least a portion of the haloalkanoate units of the vinyl ester-block-vinyl haloalkanoate copolymer in the presence of a Bronsted base or Lewis base to form a poly(vinyl ester)-b-poly(vinyl alcohol) copolymer. The vinyl ester monomers may be vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, vinyl trifluoroacetate, or vinyl 2-chloropropionate.

In another embodiment, the invention provides a method of making a poly(vinyl alcohol)-b-poly(vinyl ester) block copolymer comprising contacting vinyl haloalkanoate monomers with an organobismuthine and an organic peroxide, an inorganic peroxide, or an organic diazo compound to make a vinyl haloalkanoate monomer mixture, heating the vinyl haloalkanoate monomer mixture to make a bismuth end-capped vinyl haloalkanoate polymer, cooling the bismuth end-capped vinyl haloalkanoate polymer, contacting the bismuth end-capped vinyl haloalkanoate polymer with vinyl ester monomers to make a bismuth end-capped vinyl haloalkanoate polymer-vinyl ester monomer mixture, heating the bismuth end-capped vinyl haloalkanoate polymer-vinyl ester monomer mixture to make a vinyl haloalkanoate-block-vinyl ester copolymer; and hydrolyzing at least a portion of the haloalkanoate units of the vinyl haloalkanoate-block-vinyl ester copolymer in the presence of a Bronsted base or Lewis base to form a poly(vinyl alcohol)-b-poly(vinyl ester) copolymer. The vinyl ester monomers may be vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, vinyl trifluoroacetate, or vinyl 2-chloropropionate.

Other aspects of the invention will become apparent by consideration of the detailed description and accompanying drawings.

DETAILED DESCRIPTION

Figure 1:
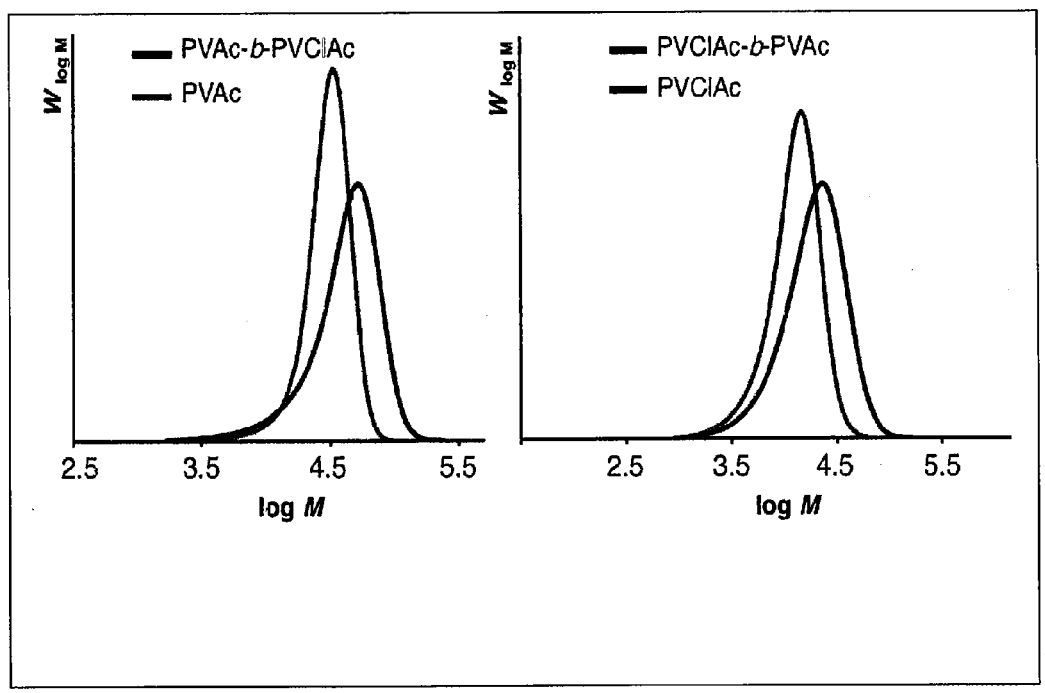
FIG. 1 shows SEC traces of PVPr-b-PVClAc diblock copolymer against PVPr homopolymer.

The invention encompasses poly(vinyl ester)-poly(vinyl alcohol) copolymers and poly(vinyl ester)-poly(vinyl haloalkanoate) copolymers. The invention additionally encompasses Reversible-Addition Fragmentation chain Transfer (RAFT), organobismuthine-mediated living radical polymerization, and cobalt-mediated radical polymerization (CMRP) methods of making poly(vinyl ester)-poly(vinyl alcohol) copolymers and poly(vinyl ester)-poly(vinyl haloalkanoate) copolymers.

Block copolymers comprise two or more different blocks of repeating units. As used herein, "diblock" refers to block copolymers that have only two blocks of repeating vinyl ester units (A-b-B). "Multiblock" refers to block copolymers that have more than two blocks of repeating vinyl ester units. For example multiblock copolymers may include three blocks of two different repeating vinyl ester units (A-b-B-b-A), or three blocks of three different repeating vinyl ester units (A-b-B-b-C). Multiblock copolymers may include four blocks of two different repeating vinyl ester units (A-b-B-b-A-b-B), four blocks of three different repeating vinyl ester units (A-b-B-b-C-b-A or A-b-B-b-C-b-B), or four blocks of four different repeating vinyl ester units (A-b-B-b-C-b-D). Multiblock copolymers may include five, or six, or seven, or eight, or nine, or ten, or eleven, or twelve, etc., blocks of repeating vinyl ester units. Multiblock copolymers may include repeating units which are not vinyl esters as well. Multiblock copolymers may be linear, branched, or star-shaped.

In general, block (diblock and multiblock) copolymers of the invention contain repeating units of:

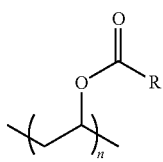

wherein R is H, $C_1$-$C_{22}$ straight or branched alkyl or alkylhalide, or phenyl or substituted phenyl, and n is 10 to 12,000. The number of repeating units, n, (also the "chain length") may be greater than 100, greater than 1000, or greater than 10,000. As used herein, the term "alkyl" refers to branched and unbranched, saturated or unsaturated, substituted or unsubstituted alkyl groups, such as alkenyl and alkynyl groups. "Alkylhalide" refers to the partial or total halogenated equivalents of the alkyl structures, i.e., fluoro, chloro, bromo, or iodo. Additionally, as used herein, "substituted phenyl" refers to phenyl moieties substituted with $C_1$-$C_6$ alkyl, alkoxy, amino, dialkyl amino, or halo (i.e., fluoro, chloro, bromo, or iodo) at any carbon of the phenyl ring. In some embodiments, the vinyl ester repeating units may be vinyl acetate (VAc), vinyl pivalate (VPv), vinyl benzoate (VBz), vinyl propionate (VPr), vinyl butyrate (VBut), vinyl stearate (VSt), vinyl chloroacetate (VClAc), vinyl dichloroacetate, vinyl trichloroacetate, vinyl fluoroacetate, vinyl trifluoroacetate, or vinyl 2-chloropropionate, or some combination thereof.

A "repeating unit" refers, generally, to a repeating molecular structure in a polymer, typically resulting from the polymerization of a monomer. As used herein, "monomer" typically refers to a separate molecular precursor to a polymer, e.g., vinyl acetate monomer, $CH_3COOCH=CH_2$. However, in some instances "monomers" may be used colloquially to refer to the repeating structure inside a polymer. Multiblock copolymers may include repeating units which are not vinyl esters in addition to vinyl esters. Such non-vinyl ester repeating units include, but need not be limited to, styrenes and substituted styrenes, alkyl-, phenyl-, and substituted phenyl-acrylates; alkyl-, phenyl-, and substituted phenyl-methacrylates; alkyl-, phenyl-, and substituted phenyl-acrylamides; and alkyl-, phenyl-, and substituted phenyl-methacrylamides.

Typically, poly(vinyl ester)-poly(vinyl alcohol) copolymers and poly(vinyl ester)-poly(vinyl haloalkanoate) copolymers of the invention have low polydispersity indices, indicating that the blocks are relatively consistent in chain length. (Polydispersity is defined as the ratio of the weight average molecular weight ($M_w$) divided by the number average molecular weight ($M_n$).) Poly(vinyl ester) block copolymers of the invention have polydispersity indices greater than about 1.0, typically greater than about 1.2, sometimes greater than about 1.4. Poly(vinyl ester) block copolymers of the invention may have polydispersity indexes less than about 2, typically less than about 1.9, sometimes less than about 1.5.

Poly(vinyl ester)-poly(vinyl alcohol) copolymers of the invention may find a wide variety of applications due to their chemical degradability and biodegradability. In general, homopolymers of vinyl esters are known to degrade chemically and biologically through ester side chain hydrolysis to yield carboxylic acids and poly(vinyl alcohol). The poly(vinyl alcohol), in, turn, degrades by a variety of mechanisms to produce small molecules including acetaldehyde and acetic acid, which are incorporated into the environment. Poly(vinyl ester)-poly(vinyl alcohol) copolymers described herein are expected to chemically degrade and to biodegrade via similar mechanisms.

The ability to engineer specific diblock and multiblock copolymers will allow engineers and materials scientists the flexibility to choose specific nanoscale morphologies in order to control the bulk properties of poly(vinyl ester) copolymers and plastics incorporating the copolymers. Such copolymers may possess unique anisotropies that are not present in homopolymers or random copolymers produced from the same monomers. For example, block copolymers may have higher tensile strengths when compared to their homopolymer equivalents, or they may have superior "memory" once deformed, or they may self-heal. Additionally, poly(vinyl ester) block copolymers of the invention are melt stable, allowing them to be processed and utilized with conventional plastic engineering technology, including, but not limited to, injection molding, blow molding, casting, solvent casting, melt extrusion, melt spinning, and melt-drawing.

Poly(vinyl ester)-poly(vinyl alcohol) copolymers and poly(vinyl ester)-poly(vinyl haloalkanoate) copolymers of the invention may also lead to the development of new polymeric materials and polymer surfactants for biomedical applications. Such polymeric materials may be used for tissue/cell culture substrates, medical devices, surgical sutures, and drug delivery systems, among other applications. Other uses of the poly(vinyl ester)-poly(vinyl alcohol) copolymers and poly(vinyl ester)-poly(vinyl haloalkanoate) copolymers of the invention will be evident to those of skill in the relevant art.

Diblock and multiblock poly(vinyl ester) block copolymers may be formed using Reversible Addition-Fragmentation Chain Transfer Polymerization (RAFT), a controlled polymerization technique in which monomers are polymerized to form blocks of repeating units with relatively narrow polydispersities. One method of Reversible Addition-Fragmentation Chain Transfer Polymerization, suitable for the formation of homopolymers of vinyl monomers, is disclosed in U.S. Pat. No. 6,747,111, incorporated herein by reference in its entirety. A method of forming diblock copolymers of vinyl esters, such as vinyl acetate, vinyl pivalate, and vinyl benzoate is disclosed in Lipscomb et al. "Poly(vinyl ester) block copolymers synthesized by Reversible Addition-Fragmentation Chain Transfer Polymerizations," *Macromolecules* (2009), vol. 42, 4571-4579, incorporated herein by reference in its entirety.

Generally, poly(vinyl ester)-poly(vinyl alcohol) diblock copolymers of the invention can be formed by contacting a vinyl haloalkanoate monomer with a macro-RAFT agent of the structure:

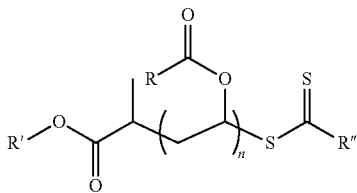

wherein R is H, $C_1$-$C_{22}$ straight or branched alkyl or alkylhalide, or phenyl or substituted phenyl, R' is $C_1$-$C_6$ branched or straight-chain alkane, R" is $C_1$-$C_4$ alkoxy, phenoxy or substituted phenoxy, or $NR'''_2$, wherein R''' is phenyl or substituted phenyl, and n is 10 to 12,000. The resulting poly(vinyl ester)-poly(vinyl haloalkanoate) copolymer may then be hydrolyzed to produce a poly(vinyl ester)-poly(vinyl alcohol) copolymer. The first block of the diblock copolymer becomes a portion of the macro RAFT agent, and the second block is formed via controlled chain extension RAFT polymerization.

Monomers suitable for use in the formation of poly(vinyl ester) diblock copolymers include any vinyl ester monomer of the structure:

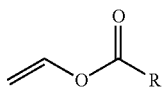

wherein R is H, $C_1$-$C_{22}$ straight or branched alkyl or alkylhalide, or phenyl or substituted phenyl. Monomers suitable for use in the formation of poly(vinyl ester) diblock copolymers include, but need not be limited to, vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, and vinyl trifluoroacetate.

Suitable vinyl haloalkanoate monomers include vinyl haloalkanoates of the structure:

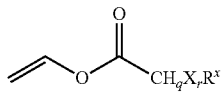

wherein X is fluorine or chlorine, q is 0 or 1, r is 2–q, $R^x$ is H, F, Cl, $CH_3$ or $(CH_2)_t CH_3$, and t is 1 to 16. Suitable vinyl haloalkanoates include vinyl haloacetates such as those of the formula:

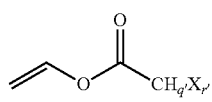

wherein X is fluorine or chlorine, q' is 0, 1, or 2 and r' is 3–q'. Specific vinyl haloalkanoate monomers may include vinyl chloroacetate (VClAc), vinyl dichloroacetate, vinyl trichloroacetate, vinyl 2-chloropropionate, vinyl fluoroacetate, vinyl difluoroacetate, vinyl trifluoroacetate, and vinyl 2-fluoropropionate.

Additionally, the methods of the invention may be used to create multiblock copolymers using Reversible Addition-Fragmentation Chain Transfer Polymerizations. In one embodiment, a controlled free radical polymerization with vinyl ester monomers forms a macro-RAFT agent of the structure:

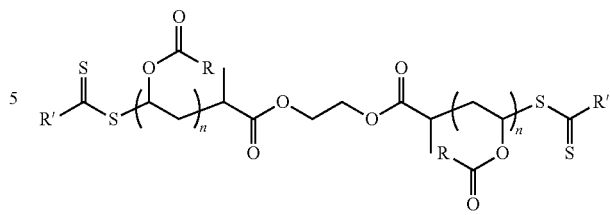

wherein R is H, $C_1$-$C_{22}$ straight or branched alkyl or alkylhalide, or phenyl or substituted phenyl, R' is $C_1$-$C_4$ alkoxy, phenoxy or substituted phenoxy, or $NR_2$" wherein R" is phenyl or substituted phenyl, and n is 10 to 12,000. The macro-RAFT agent (above) may, in turn, be used to produce multiblock copolymers comprising poly(vinyl haloalkanoate). The resulting poly(vinyl ester)-poly(vinyl haloalkanoate) copolymer may then be hydrolyzed to produce a poly(vinyl ester)-poly(vinyl alcohol) copolymer. Using the macro-RAFT agent above, an A-b-B-b-A type multiblock copolymer results when the macro-RAFT agent is contacted with a vinyl ester monomer.

Vinyl ester monomers suitable for use in the formation of poly(vinyl ester) multiblock copolymers include any vinyl ester monomer of the structure:

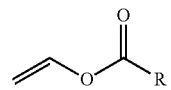

wherein R is H, $C_1$-$C_{22}$ straight or branched alkyl or alkylhalide, or phenyl or substituted phenyl. Monomers suitable for use in the formation of poly(vinyl ester) diblock copolymers include, but need not be limited to, vinyl acetate (VAc), vinyl pivalate (VPv), vinyl benzoate (VBz), vinyl propionate (VPr), vinyl butyrate (VBut), vinyl stearate (VSt), vinyl fluoroacetate, vinyl difluoroacetate, and vinyl trifluoroacetate.

Suitable vinyl haloalkanoate monomers include vinyl haloalkanoates of the structure:

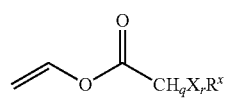

wherein X is fluorine or chlorine, q is 0 or 1, r is 2–q, $R^x$ is H, F, Cl, $CH_3$ or $(CH_2)_t CH_3$, and t is 1 to 16. Suitable vinyl haloalkanoates include vinyl haloacetates such as those of the formula:

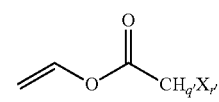

wherein X is fluorine or chlorine, q' is 0, 1 or 2 and r' is 3–q'. Specific vinyl haloalkanoate monomers may include vinyl chloroacetate (VClAc), vinyl dichloroacetate, vinyl trichioroacetate, vinyl 2-chloropropionate, vinyl fluoroacetate, vinyl difluoroacetate, vinyl trifluoroacetate, and vinyl 2-fluoropropionate.

Diblock and multiblock copolymers may also be formed by preparing RAFT agents having blocks of poly(vinyl haloalkanoates) which are reacted with the vinyl ester monomers outlined above. Suitable vinyl haloalkanoates may include those described above. The resulting polyvinyl haloalkanoate)-poly(vinyl ester) copolymers may then be hydrolyzed to produce poly(vinyl alcohol)-poly(vinyl ester) copolymers.

Poly(vinyl ester)-poly(vinyl alcohol) copolymers and poly(vinyl ester)-poly(vinyl haloalkanoate) copolymers of the invention may also be formed via cobalt-mediated radical polymerization (CMRP), whereby vinyl esters are polymerized in the presence of cobalt(II) acetylacetonate and an organic peroxide, an inorganic peroxide, or an organic diazo compound and a reducing agent. Generally, a solution of a vinyl ester monomer is heated in the presence of cobalt(II) acetylacetonate, an initiator, and a reducing agent for some time to polymerize the monomer, resulting in a cobalt end-capped first homopolymer block. The temperature of the polymerization reaction is greater than −10° C., typically greater than 10° C., more typically greater than 20° C. The time of polymerization is less than 24 hours, typically less than 12 hours, more typically less than 8 hours. The chain length of the block will generally be greater 1) at higher reaction temperatures and 2) at longer reaction times. Once the chain length of the block has reached a sufficient length, the polymerization can be interrupted by cooling, and excess monomer can be removed from the solution to produce a cobalt end-capped first poly(vinyl ester) polymer. A vinyl haloalkanoate block may be added to the vinyl ester block by mixing the poly(vinyl ester) polymer with a vinyl haloalkanoate monomer, without introducing additional cobalt(II) acetylacetonate, additional initiator, nor additional reducing agent, and subsequently increasing the temperature to cause the vinyl haloalkanoate monomer to polymerize with the poly(vinyl ester) polymer, thereby producing a cobalt end-capped A-b-B type diblock copolymer. The resulting poly(vinyl ester)-poly(vinyl haloalkanoate) copolymer may then be hydrolyzed to produce a poly(vinyl ester)-poly(vinyl alcohol) copolymer.

The fundamental mechanism of cobalt-mediated radical polymerization is described in greater detail in Debuigne, et al. "Overview of cobalt-mediated radical polymerization: Roots, state of the art and future prospects," *Progress in Polymer Science* (2009) vol. 34, 211-239 incorporated herein by reference in its entirety. Initiators suitable for use with the cobalt-mediated radical polymerization methods of the invention include organic peroxide, inorganic peroxide, and organic diazo compounds. Such initiators include, but are not limited to, azobis(isobutyronitrile) (AIBN), LUPEROX™, 2,2'-azobis(4-methoxy-2,4-dimethyl valeronitrile), 1,1'-azobis(cyclohexane-1-carbonitrile), and 2,2'-azobis(2,4-dimethyl valeronitrile).

Vinyl ester monomers suitable for use in the formation of poly(vinyl ester) diblock copolymers with CMRP include any vinyl ester monomer of the structure:

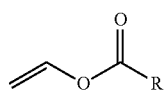

wherein R is H, $C_1$-$C_{22}$ straight or branched alkyl or alkylhalide, or phenyl or substituted phenyl. Suitable monomers may include, but need not be limited to, vinyl acetate (VAc), vinyl pivalate (VPv), vinyl benzoate (VBz)', vinyl propionate (VPr), vinyl butyrate (VBut), vinyl stearate (VSt), vinyl difluoroacetate, vinyl fluoroacetate, and vinyl trifluoroacetate.

Suitable vinyl haloalkanoate monomers include vinyl haloalkanoates of the structure:

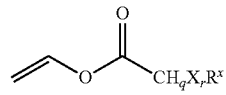

wherein X is fluorine or chlorine, q is 0 or 1, r is 2−q, $R^x$ is H, F, Cl, $CH_3$ or $(CH_2)_tCH_3$, and t is 1 to 16. Suitable vinyl haloalkanoates include vinyl haloacetates such as those of the formula:

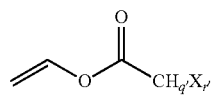

wherein X is fluorine or chlorine, q' is 0, 1 or 2 and r' is 3−q'. Specific vinyl haloalkanoate monomers may include vinyl chloroacetate (VClAc), vinyl dichloroacetate, vinyl trichloroacetate, vinyl 2-chloropropionate, vinyl fluoroacetate, vinyl difluoroacetate, vinyl trifluoroacetate, and vinyl 2-fluoropropionate.

Multiblock poly(vinyl ester)-poly(vinyl alcohol) copolymers and multiblock poly(vinyl ester)-poly(vinyl haloalkanoate) copolymers of the invention may also be formed with CMRP by polymerizing the same or different vinyl esters with diblock copolymers, formed above, in the presence of cobalt(II) acetylacetonate and an organic peroxide, an inorganic peroxide, or an organic diazo compound, and a reducing agent. Thus, it is possible to form A-b-B-b-A multiblock copolymers as well as A-b-B-b-C multiblock copolymers. The method may be generally extended to create multiblock copolymers having four, five, six, seven, eight, etc., blocks of vinyl esters.

As for the diblock copolymers, vinyl ester monomers suitable for use in the formation of poly(vinyl ester) multiblock copolymers with CMRP include any vinyl ester monomer of the structure:

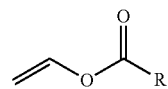

wherein R is H, $C_1$-$C_{22}$ straight or branched alkyl or alkylhalide, or phenyl or substituted phenyl. Suitable monomers may include, but need not be limited to, vinyl acetate (VAc), vinyl pivalate (VPv), vinyl benzoate (VBz), vinyl propionate (VPr), vinyl butyrate (VBut), vinyl stearate (VSt), vinyl fluoroacetate, and vinyl trifluoroacetate.

Suitable vinyl haloalkanoate monomers include vinyl haloalkanoates of the structure:

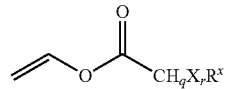

wherein X is fluorine or chlorine, q is 0 or 1, r is 2−q, $R^x$ is H, F, Cl, $CH_3$ or $(CH_2)_tCH_3$, and t is 1 to 16. Suitable vinyl haloalkanoates include vinyl haloacetates such as those of the formula:

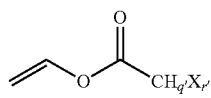

wherein X is fluorine or chlorine, q' is 0, 1 or 2 and r' is 3–q'. Specific vinyl haloalkanoate monomers may include vinyl chloroacetate (VClAc), vinyl dichloroacetate, vinyl trichloroacetate, vinyl 2-chloropropionate, vinyl fluoroacetate, vinyl difluoroacetate, vinyl trifluoroacetate, and vinyl 2-fluoropropionate.

Diblock and multiblock copolymers may also be formed by performing CMRP with vinyl haloalkanoate monomers to create poly(vinyl haloalkanoate) polymers which are reacted with the vinyl ester monomers outlined above. The resulting poly(vinyl haloalkanoate)-poly(vinyl ester) copolymers may then be hydrolyzed to produce poly(vinyl alcohol)-poly(vinyl_ ester) copolymers.

In another embodiment of the invention, poly(vinyl ester)-poly(vinyl alcohol) copolymers and poly(vinyl ester)-poly(vinyl haloalkanoate) copolymers may be formed via organobismuthine-mediated living radical polymerization (BIRP), whereby vinyl esters are polymerized at approximately 100° C. in the presence of organobismuthine chain transfer agents such as:

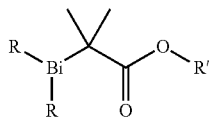

wherein R is $C_1$-$C_{22}$ straight or branched alkyl, and R' is $C_1$-$C_{22}$ straight or branched alkyl, phenyl or substituted phenyl, and, an organic peroxide, an inorganic peroxide, or an organic diazo compound, to produce a vinyl ester block. Upon cooling this reaction, the resultant bismuth end-capped vinyl ester homopolymer may be isolated and subsequently used as a organobismuthine macromolecular chain transfer agent of the form:

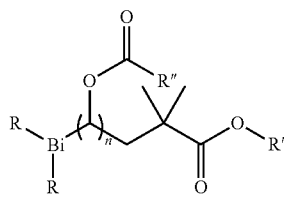

wherein R is $C_1$-$C_{22}$ straight or branched alkyl, and R' is $C_1$-$C_{22}$ straight or branched alkyl, phenyl or substituted phenyl, R" is H, $C_1$-$C_{22}$ straight or branched alkyl or alkylhalide, or phenyl or substituted phenyl, and n is 10 to 12,000. Polymerization of a vinyl haloalkanoate monomer with the macro organobismuthine chain transfer agent can then be initiated at elevated temperature to form a poly(vinyl ester)-poly(vinyl haloalkanoate) diblock copolymer. The resulting poly(vinyl ester)-poly(vinyl haloalkanoate) copolymer may then be hydrolyzed to produce a poly(vinyl ester)-poly(vinyl alcohol) copolymer.

In some embodiments, polymerization may be initiated with an organic peroxide, an inorganic peroxide, or an organic diazo compound. By stopping the chain extension block copolymerization to form a diblock macro organobismuthine chain transfer agent, and subsequently contacting the macro organobismuthine chain transfer agent with a third vinyl ester monomer, multiblock poly(vinyl ester) copolymers may be formed of the type A-b-B-b-A, and A-b-B-b-C, etc. Vinyl ester monomers suitable for use in the formation of poly(vinyl ester) multiblock copolymers with organobismuthine-mediated living radical polymerization include any vinyl ester monomer of the structure:

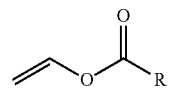

wherein R is H, $C_1$-$C_{22}$ straight or branched alkyl or alkylhalide, or phenyl or substituted phenyl. Suitable monomers may include, but need not be limited to, vinyl acetate (VAc), vinyl pivalate (VPv), vinyl benzoate (VBz), vinyl propionate (VPr), vinyl butyrate (VBut), vinyl stearate (VSt), vinyl fluoroacetate, and vinyl trifluoroacetate.

Diblock and multiblock copolymers may also be formed by performing BIRP with vinyl haloalkanoate monomers to create poly(vinyl haloalkanoate) polymers which are reacted with the vinyl ester monomers outlined above. Vinyl haloalkanoates may include vinyl chloroacetate (VClAc), vinyl dichloroacetate, vinyl trichloroacetate, vinyl 2-chloropropionate, vinyl fluoroacetate, vinyl difluoroacetate, vinyl trifluoroacetate, and vinyl 2-fluoropropionate. The resulting poly(vinyl haloalkanoate)-poly(vinyl ester) copolymers may then be hydrolyzed to produce poly(vinyl alcohol)-poly(vinyl ester) copolymers.

The synthesis of block copolymers containing poly(vinyl alcohol) segments can be achieved via the selective hydrolysis of more labile pendant ester functionalities in appropriate poly(vinyl ester) block copolymers, as shown in Scheme 1.

Scheme 1: Synthesis of poly(vinyl alcohol) block copolymers.

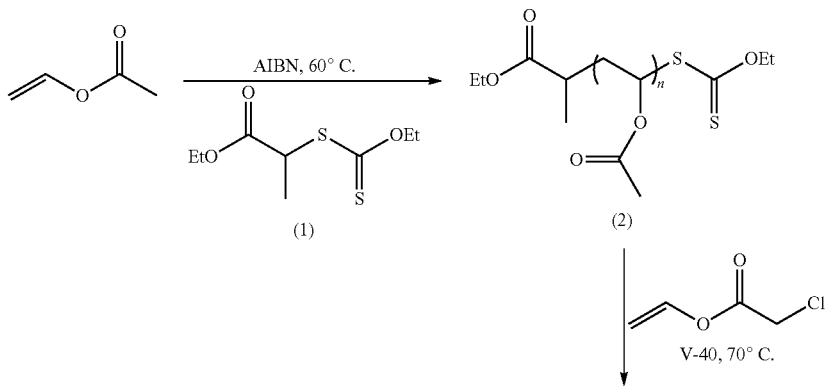

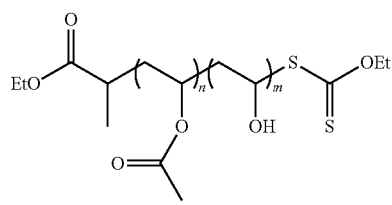 → 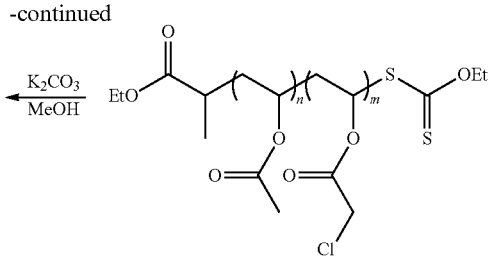

Block copolymers comprised of different vinyl ester blocks present differentially protected poly(vinyl alcohol) segments that may be selectively deprotected to unmask a hydrophilic PVA block. For example, poly(vinyl pivalate-b-vinyl acetate) (PVPv-b-PVAc) contains two homopolymer segments that have different steric parameters that render the acetate esters easier to hydrolyze than the pivalate esters. Selective hydrolysis of the acetate esters presents a potential route to a poly(vinyl pivalate-b-vinyl alcohol) (PVPv-b-PVA) diblock copolymers.

Figure 2:
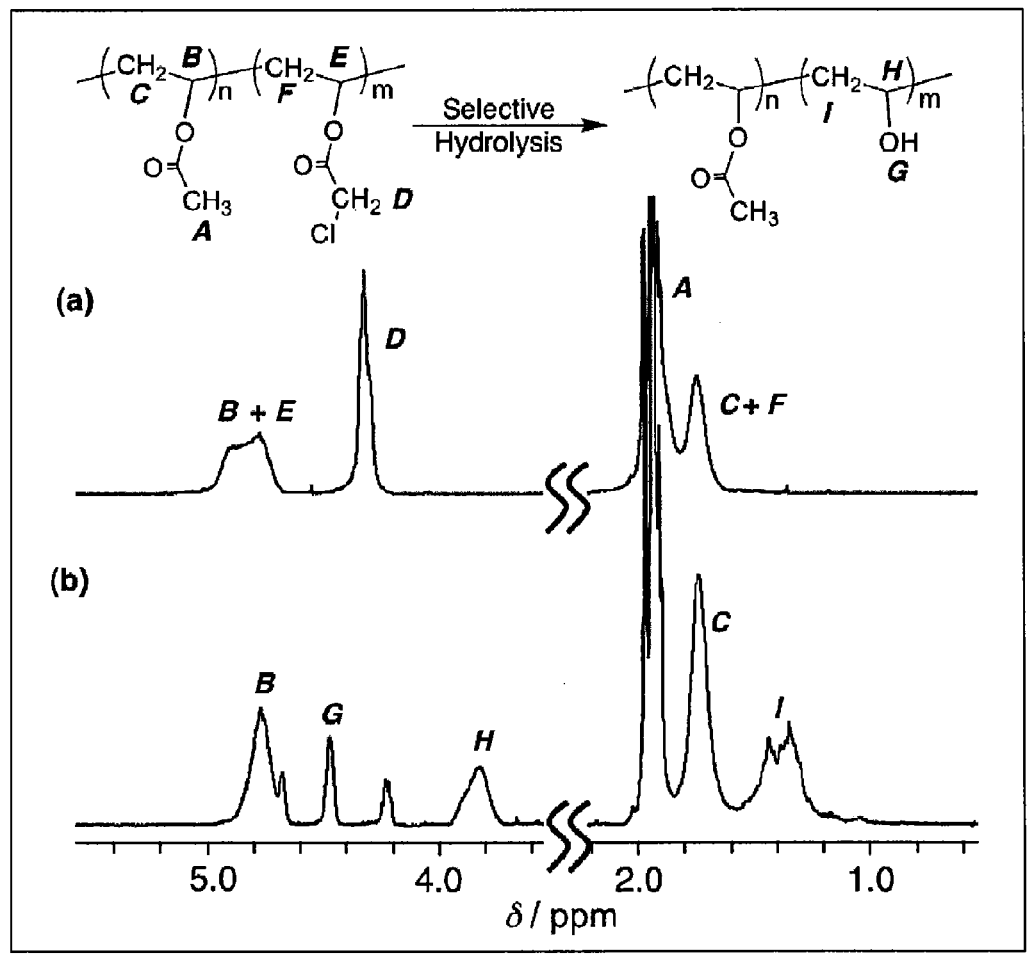
FIG. 2 shows SEC traces of PVAc-b-PVClAc-2 diblock copolymer against PVAc homopolymer.
Figure 3:
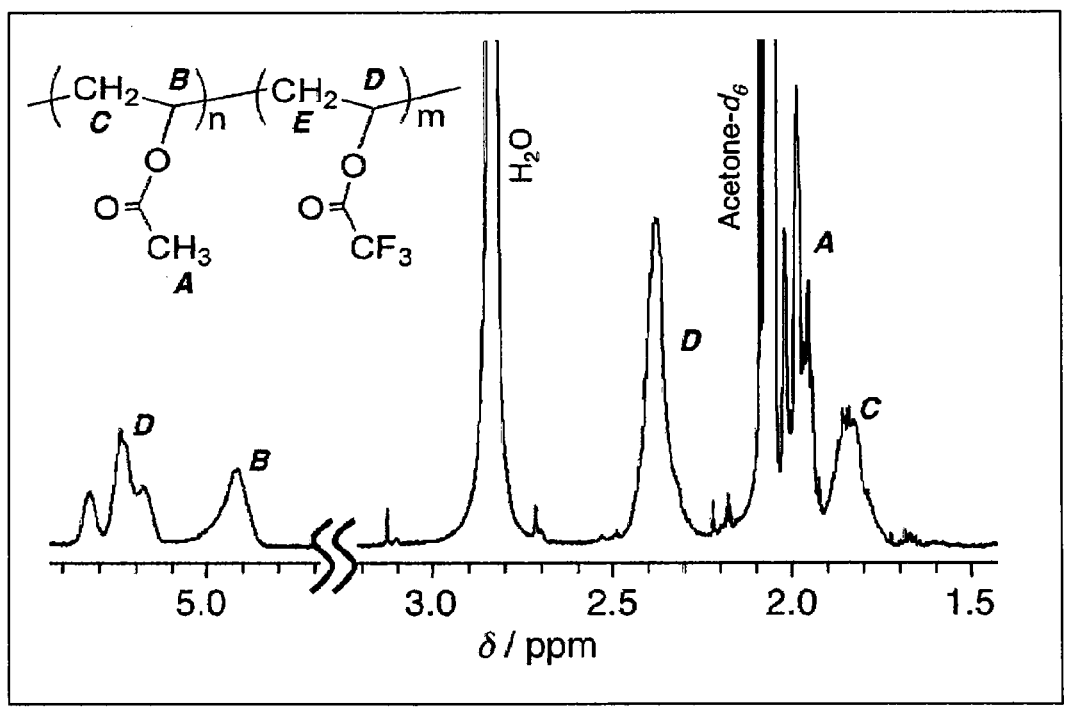
FIG. 3 shows SEC traces of PVClAc-b-PVAc-4 diblock copolymer against PVClAc homopolymer.

For example, PVAc-b-PVA diblock copolymers can be created via the controlled polymerization of vinyl chloroacetate (VClAc) and subsequent incorporation of poly(vinyl chloroacetate) (PVClAc) blocks into poly(vinyl ester) block copolymers. Using a xanthate-terminated poly(vinyl acetate) (PVAc) produced by RAFT polymerization as a macromolecular chain transfer agent, chain extension RAFT block copolymerization of vinyl chloroacetate can be achieved under controlled conditions. See Scheme 1 and Table 1. Block copolymerizations conducted at 60° C. in ClCH$_2$CH$_2$Cl proceed rapidly to produce high polydispersity materials. Increasing the temperature of the polymerization to 70° C. yields well-defined poly(vinyl acetate-b-vinyl chloroacetate) (PVAc-b-PVClAc) with overall polydispersity indices $M_w/M_n$=1.31-1.68 wherein the polymerization composition and molecular weight are governed by the monomer conversion (typically less than 30%). Alternatively, PVClAc-b-PVAc diblock copolymers with slightly broader polydispersities can be synthesized via sequential block copolymerization of VClAc followed by VAc (Table 1). Representative size exclusion chromatography (SEC) traces of PVAc-b-PVClAc and PVClAc-b-PVAc block copolymers demonstrate that these highly efficient chain extension reactions produce unimodal polymers with relatively narrow molecular weight distributions. (FIGS. 2 and 3)

TABLE 1

Poly(vinyl acetate-b-vinyl chloroacetate) diblock copolymers

| Sample[a] | $M_{n\ total}$ (kg mol$^{-1}$)[b] | $M_w/M_n$[c] | Mol fraction PVClAc |
|---|---|---|---|
| PVAc-b-PVClAc-1 | 15.1 | 1.31 | 0.196 |
| PVAc-b-PVClAc-2 | 19.9 | 1.46 | 0.375 |
| PVClAc-b-PVAc-3 | 14.2 | 1.66 | 0.461 |
| PVClAc-b-PVAc-4 | 9.47 | 1.31 | 0.495 |
| PVClAc-b-PVAc-5 | 14.5 | 1.45 | 0.565 |
| PVClAc-b-PVAc-6 | 9.81 | 1.45 | 0.725 |
| PVClAc-b-PVAc-6 | 10.1 | 1.40 | 0.901 |

[a]Reaction conditions: In all reactions the [V-40]~0.30 mM, [Xanthalate]~4.0-23 mM, and 8.0 mL of dichloroethane were used as solvent. All reactions were carried out at temperatures ranging from 70-88° C.
[b]Determined from composition analysis of the copolymer by quantitative $^1$H-NMR analysis and the absolute $M_n$ (from SEC) of the parent homopolymer block.
[c]Determined by SEC calibrated with polystyrene standards.

Hydrolysis of poly(vinyl haloalkanoate) blocks to form poly(vinyl alcohol) blocks can be achieved by several procedures known to those of skill in the art, including, but not limited to, treatment with Bronsted base or Lewis base to forming a poly(vinyl alcohol)-b-poly(vinyl ester) block copolymer. In one embodiment, poly(vinyl ester)-poly(vinyl haloalkanoate) copolymers are dissolved in methanol, to which K$_2$CO$_3$ is added and allowed to react for sometime, after which the methanol is removed by rotary evaporation. The product is triturated with distilled water, centrifuged to isolate the poly(vinyl alcohol) copolymer and dried in vacuo at room temperature.

It is to be understood that the invention is not limited in its application to the details of construction and the arrangement of components set forth in the description. The invention is capable of other embodiments and of being practiced or of being carried out in various ways. Also it is to be understood that the phraseology and terminology used herein is for the purpose of description and should not be regarded as limiting.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

Further, no admission is made that any reference, including any patent or patent document, cited in this specification constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein.

EXAMPLES

Example 1

Synthesis of PVPr-b-PVA Copolymer

Vinyl propionate homopolymers were prepared using RAFT. RAFT chain transfer agent O-ethylxanthyl ethyl propionate (Xanthate 1 of Scheme 1) was synthesized according to literature procedures. See, Lipscomb et al., *Macromolecules* (2009). Xanthate 1 (66.5 mg, 0.299 mmol) and AIBN (Sigma-Aldrich, St. Louis, Mo.; 3.6 mg, 0.0219 mmol) were dissolved in vinyl propionate (VPr) that had been fractionally distilled under nitrogen from calcium hydride (Sigma-Aldrich; 10.0 mL, 78.1 mmol) to generate a solution having [VPr]:[Xanthate 1]:[AIBN]=3566:13.65:1. The solution was sealed in a flask, degassed by three freeze-pump-thaw cycles, and placed in an oil bath at 60° C. After 2.0 h, the reaction was removed from the oil bath and rapidly cooling under running water to terminate the reaction. The resulting PVPr macro-RAFT agent was isolated by rotary evaporation of the unreacted monomer and freeze drying the solids from $C_6H_6$ (Sigma-Aldrich) in vacuo at 22° C.

The resultant PVPr macro-RAFT agent was characterized with size exclusion chromatography (SEC) and NMR. A Viscotek GPCMax System equipped with two Polymer Labs Resipore columns (250 mm×4.6 mm), differential refractometer, two angle-light scattering module (7° and 90°), and a four-capillary differential viscometer (Malvern Instruments, Malvern, UK) was used for the SEC measurements. For the SEC measurements, THF (Sigma-Aldrich) was used as the eluent at a flow rate of 1.0 mL/min: A Mark-Houwink corrected poly(vinyl acetate) calibration curve was constructed using 10 narrow molecular weight distribution polystyrene standards with $M_n$=580-377400 g/mol (Polymer Labs, Amherst, Mass.). An $M_w/M_n$ value was then calculated using a polystyrene standard calibration curve. Absolute molecular weights for poly(vinyl chloroacetate) (PVClAc) were calculated using the measured refractive index increment do/dc=0.0811 L/g for PVClAc at 22° C. in THF. Using this technique, $M_w/M_n$ for the PVPr macro-RAFT agent was determined to be 1.20 (from SEC in THF against polystyrene standards). Copolymer compositions and molecular weights were determined by integration of quantitative $^1$H NMR spectra of the PVPr macro-RAFT agent. $^1$H-NMR spectra were acquired on a Bruker AC-300 spectrometer operating at 300 MHz and referenced to the residual protiated solvent peak in the sample (i.e., $CDCl_3$, DMSO-$d_6$, or acetone-$d_6$). $M_n$ for the PVPr macro-RAFT agent was determined to be 5.62 kg/mol.

Synthesis of PVPr-b-PVClAc diblock copolymer: PVPr macro-RAFT agent (0.245 g, 0.0436 mmol, $M_n$=5.62 kg/mol, $M_w/M_n$=1.20) was dissolved in dichloroethane (DCE; Sigma-Aldrich) (8 mL). V-40 (Wako Chemicals, Richmond, Va.) (0.786 mg V-40 200 µL DCE, 3.22×10$^{-3}$ mmol) and VClAc (TCl America Inc., Portland, Oreg.; 3.57 g, 29.6 mmol) were subsequently added to the solution. The VClAc was stirred over calcium hydride and distilled under vacuum prior to use. The solution was sealed in a flask, degassed by three freeze-pump-thaw cycles, and placed in an oil bath at 70° C. After 5.0 h, the reaction was removed from the oil bath and cooled under running water to terminate the reaction. The resulting PVPr-b-PVClAc diblock copolymer was precipitated from DCE/monomer solution into hexanes (2×400 mL) and freeze-dried from $C_6H_6$ in vacuo at room temperature. $^1$H NMR demonstrates the polymer contains 60.3 mol % VClAc. $M_{n,NMR}$=14.4 kg/mol (from quantitative $^1$H NMR), $M_w/M_n$=1.49 (from SEC analysis in THF against polystyrene standards. See FIG. 1 and Table 2.

TABLE 2

Molecular Parameters of PVPr-b-PVClAc from RAFT block copolymerization

| | Initial block | | Diblock copolymer | | |
| --- | --- | --- | --- | --- | --- |
| Sample | $M_n$ (kg/mol)$^a$ | $M_w/M_n$$^b$ | $M_{n\ total}$ (kg/mol)$^c$ | $M_w/M_n$$^b$ | Mol fraction PVClAc |
| PVPr-b-PVClAc | 5.62 | 1.20 | 14.4 | 1.49 | 0.603 |

Reaction conditions: [V-40] ~0.30 mM. 8.0 mL of dichloroethane were used as solvent. Reaction temperature was 70° C.
$^a$Determined by end-group analysis.
$^b$Determined from SEC calibrated with polystyrene standards.
$^c$Determined from composition analysis of the copolymer by quantitative $^1$H NMR analysis.

Hydrolysis of PVPr-b-PVClAc to PVPr-b-PVA: PVPr-b-PVClAc (0.1027 g, 4.30×10$^{-3}$ mmol of VClAc functional groups) was dissolved in methanol (10 mL) for 5 min, to which $K_2CO_3$ (3.5 mg, 2.53×10$^{-2}$ mmol) was added and allowed to react for 3.5 h, after which the methanol was removed by rotary evaporation. The product was triturated with distilled water (15 mL×3), Centrifuged to isolate the PVA copolymer and dried in vacuo at room temperature. Polymer compositions were determined by quantitative $^1$H NMR analysis in DMSO-$d_6$: [VPr]=46.6 mol %. $M_{n,NMR}$=8.04 kg/mol.

Example 2

Synthesis of PVAc-b-PVA Copolymer

RAFT homopolymerizations of VAc were conducted according to procedure of EXAMPLE 1. Xanthate 1 (156.7 mg, 0.705 mmol) and AIBN (12.0 mg, 0.0731 mmol) were dissolved in freshly distilled VAc (30.1 mL) to generate a solution having [VAc]:[1]:[V-40]=44460:9.64:1. The solution was sealed in a flask, degassed by three freeze-pump-thaw cycles, and placed in an oil bath at 80° C. VAc homopolymerizations were typically run for 2.5-3.5 h, depending on the desired percent of monomer conversion, followed by the removal of the reaction from the oil bath and rapid cooling under running water to terminate the reaction. The resulting PVAc was precipitated into stirring hexanes (2x) and dried in vacuo at room temperature. Monomer conversions were measured gravimetrically. $M_{n,SEC}$=10.8 kg/mol (31.9% conversion), $M_w/M_n$=1.23.

Synthesis of PVAc-b-PVClAc-2 diblock copolymer. PVAc macro-RAFT agent (1.6252 g, 0.1505 mmol, $M_n$=10.8 kg/mol, =1.23) was dissolved in DCE (2 mL). V-40 (3.67 mg V-40 in 200 µL DCE solution, 1.50×10$^{-2}$ mmol) and VClAc (9.54 g, 79.12 mmol) were subsequently added to the solution. The solution was sealed in a flask, degassed by three freeze-pump-thaw cycles, and placed in an oil bath at 80° C. After 20 h, the reaction was removed from the oil bath and cooled under running water to terminate the reaction. The resulting polymer was precipitated two times into hexanes and freeze-dried from $C_6H_6$ in vacuo at 22° C. The resulting polymer contained 37.5 mol % VClAc ($^1$H NMR). $M_{n,calc}$=19.9 kg/mol (from $^1$H NMR), $M_w/M_n$=1.46 (from SEC against PS Standards). See FIGS. 2 and 3.

Figure 4:
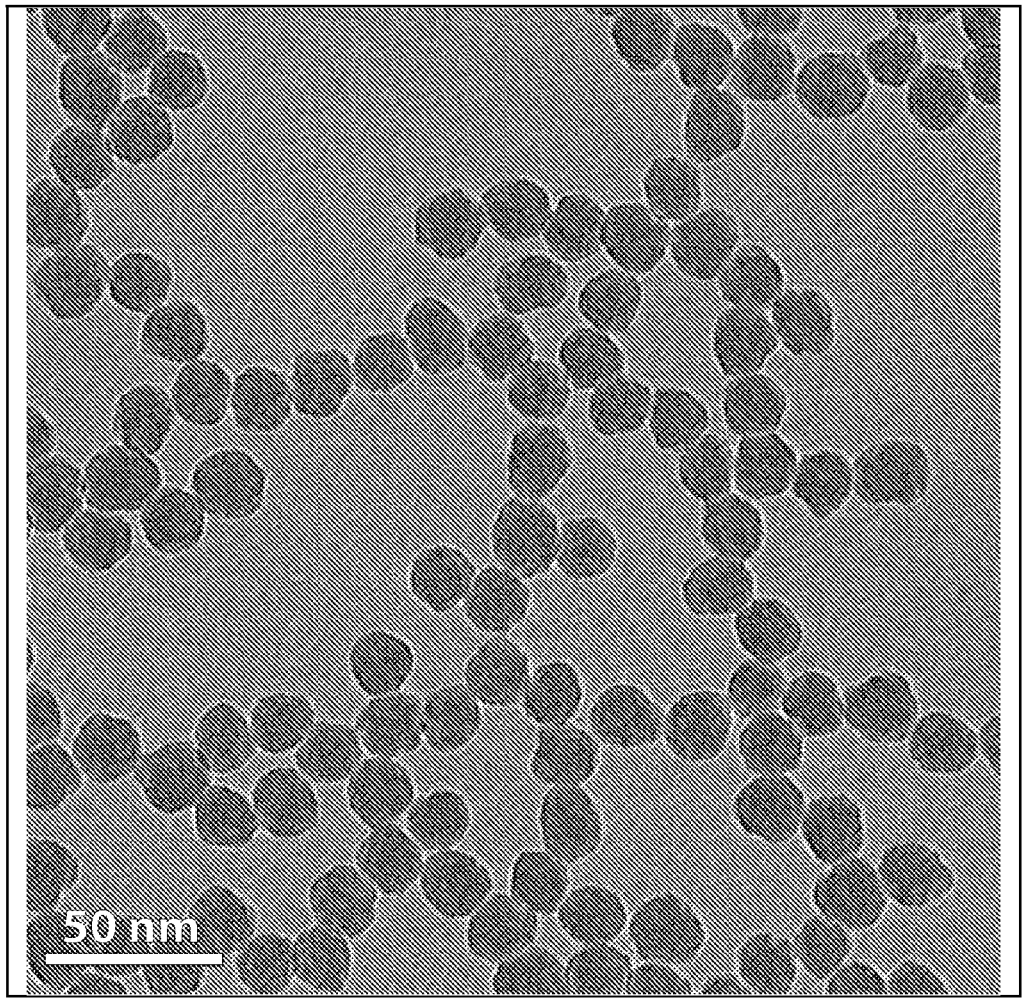
FIG. 4 shows $^1$H-NMR overlay of: (a) PVClAc-b-PVAc-5 and (b) PVA-b-PVAc-5 showing the disappearance of peaks D and E characteristic of PVClAc upon treatment with $K_2CO_3$/MeOH and the appearance of peaks G and H associated with PVA, indicating selective hydrolysis of the chloroacetate esters.

Hydrolysis of PVAc-b-PVClAc-2 to PVAc-b-PVA-2: PVAc-b-PVClAc-2 (0.2051 g, 3.86 ×10$^{-3}$ mmol of VClAc functional groups) was dissolved in methanol (15 mL) for 5 min. $K_2CO_3$ (4.7 mg, $3.40 \times 10^{-2}$ mmol) was added to the solution and allowed to react for 3.5 h, after which the methanol was removed by rotary evaporation. The product was triturated with distilled water (15 mL×3), centrifuged to isolate the polymer and dried in vacuo at room temperature. $^1H$ NMR in DMSO illustrates quantitative deprotection of the chloroacetate groups. The resulting polymer contains 25.4 mol % PVA ($^1H$ NMR) from which the total $M_{n,calc}$=12.7 kg/mol. $^1H$ NMR: (299.7 MHz, DMSO-$d_6$, 22° C.) δ 1.370, 1.728, 1.925, 3.817, 4.21, 4.435, 4.652, 4.758. The shifts in $^1H$ NMR resonances upon conversion of PVClAc blocks to PVA blocks can be seen in FIG. 4 for the related polymer PVAc-b-PVA-5.

Example 3

Synthesis of PVA-b-PVAc Copolymer

RAFT homopolymerizations of VClAc were conducted according to procedure of EXAMPLE 1. Xanthate 1 (23.2 mg, 1.04 mmol) and V-40 (23.0 mg, 0.0941 mmol) were dissolved in freshly distilled VClAc (20.685 g, 0.172 mol) to generate a solution having [VClAc]:[1]:[V-40]=1823:11.1:1. The solution was sealed in a flask, degassed by three freeze-pump-thaw cycles, and placed in an oil bath at 80° C. VClAc homopolymerizations were typically run for 2.5-3.5 h, depending on the desired percent of monomer conversion, followed by the removal of the reaction from the oil bath and rapid cooling under running water to terminate the reaction. The resulting PVClAc was precipitated into stirring hexanes (2×) and dried in vacuo at room temperature. Monomer conversions were measured gravimetrically. $M_{n,SEC}$=5.48 kg/mol (23.1% conversion), $M_w/M_n$=1.29.

Synthesis of PVClAc-b-PVAc-4 diblock copolymer. PVClAc macro-RAFT agent (0.831 g, 0.1517 mmol, $M_n$=5.48 kg/mol, $M_w/M_n$=1.29) was dissolved in DCE (7 mL). V-40 (3.67 mg V-40 in 200 μL DCE solution, $1.50 \times 10^{-2}$ mmol) and VAc (3.60 g, 41.8 mmol) were subsequently added to the solution. The solution was sealed in a flask, degassed by three freeze-pump-thaw cycles, and placed in an oil bath at 80° C. After 5.0 h, the reaction was removed from the oil bath and cooled under running water to terminate the reaction. The resulting polymer was precipitated two times into hexanes and freeze-dried from $C_6H_6$ in vacuo at 22° C. The resulting polymer contained 49.5 mol % VClAc ($^1H$ NMR). $M_{n,calc}$=9.47 kg/mol (from $^1H$ NMR), $M_w/M_n$=1.31 (from SEC against PS Standards). See FIG. 3.

Hydrolysis of PVClAc-b-PVAc-4 to PVA-b-PVAc-4: PVClAc-b-PVAc-4 (0.2128 g, $1.11 \times 10^{-3}$ mmol of VClAc functional groups) was dissolved in methanol (20 mL) for 5 min. $K_2CO_3$ (11 mg, $7.96 \times 10^{-2}$ mmol) was added to the solution and allowed to react for 2.5 h, after which the methanol was removed by rotary evaporation. The product was triturated with distilled water (15 mL×3), centrifuged to isolate the polymer and dried in vacuo at room temperature. $^1H$ NMR in DMSO illustrates quantitative deprotection of the chloroacetate groups. The resulting polymer contains 39.9 mol % PVA NMR) from which the total $M_{n,calc}$=5.48 kg/mol. $^1H$ NMR: (299.7 MHz, DMSO-$d_6$, 22° C.) δ 1.370, 1.728, 1.925, 3.817, 4.21, 4.435, 4.652, 4.758.

Example 4

Synthesis of PVPv-b-PVA Copolymer

RAFT homopolymerizations of VPv were conducted according to procedure of EXAMPLE 1. Xanthate 1 (59.5 mg, 0.268 mmol) and AIBN (6.1 mg, 0.0363 mmol) were dissolved in freshly distilled VPv (10.1 mL) to generate a solution having [VPv]:[1]:[V-40]=1873:7.38:1. The solution was sealed in a flask, degassed by three freeze-pump-thaw cycles, and placed in an oil bath at 60° C. VPv homopolymerizations were typically run for 2.5-3.5 h, depending on the desired percent of monomer conversion, followed by the removal of the reaction from the oil bath and rapid cooling under running water to terminate the reaction. Excess monomer was removed from this solution by rotary evaporation, and the resulting solid was freeze-dried from $C_6H_6$ in vacuo at room temperature. Monomer conversions were measured gravimetrically. $M_{n,SEC}$=7.11 kg/mol (36.2% conversion), $M_w/M_n$=1.25.

Typical synthesis of PVPv-b-PVClAc diblock copolymer. PVPv macro-RAFT agent (0.5355 g, 0.0752 mmol, $M_n$=7.11 kg/mol, $M_w/M_n$=1.25) was dissolved in DCE (8 mL). V-40 (1.44 mg V-40 in 200 μL DCE solution, $5.80 \times 10^{-3}$ mmol) and VClAc (5.95 g, 49.4 mmol) were subsequently added to the solution. The solution was sealed in a flask, degassed by three freeze-pump-thaw cycles, and placed in an oil bath at 70° C. After 2.0 h, the reaction was removed from the oil bath and cooled under running water to terminate the reaction. Excess monomer was removed from this solution by rotary evaporation and the resulting solid was freeze-dried from $C_6H_6$ in vacuo at 22° C. The resulting polymer contained 55.7 mol % VClAc ($^1H$ NMR). $M_{n,calc}$ 15.5=kg/mol (from $^1H$ NMR), $M_w/M_n$=1.79 (from SEC against PS Standards).

Hydrolysis of PVPv-b-PVClAc to PVPv-b-PVA: PVPv-b-PVClAc (0.2134 g, $7.67 \times 10^{-3}$ mmol of VClAc functional groups) was dissolved in methanol (10 mL) and tetrahydrofuran (3 mL) for 5 min. $K_2CO_3$ (2.1 mg, $1.52 \times 10^{-2}$ mmol) was added to the solution and allowed to react for 3.5 h, after which the methanol was removed by rotary evaporation. The product was triturated with distilled water (15 mL×3), centrifuged to isolate the polymer and dried in vacuo at room temperature. $^1H$ NMR in DMSO illustrates quantitative deprotection of the chloroacetate groups. The resulting polymer is contains 46.3 mol % PVA ($^1H$ NMR) from which the total $M_{n,calc}$=9.7 kg/mol. $^1H$ NMR: (299.7 MHz, DMSO-$d_6$, 22° C.) δ 1.20, 1.370, 1.728, 3.817, 4.21, 4.435, 4.652, 4.758.

Example 5

Synthesis of PVAc-b-PVTFAc-5 Copolymer

Figure 5:
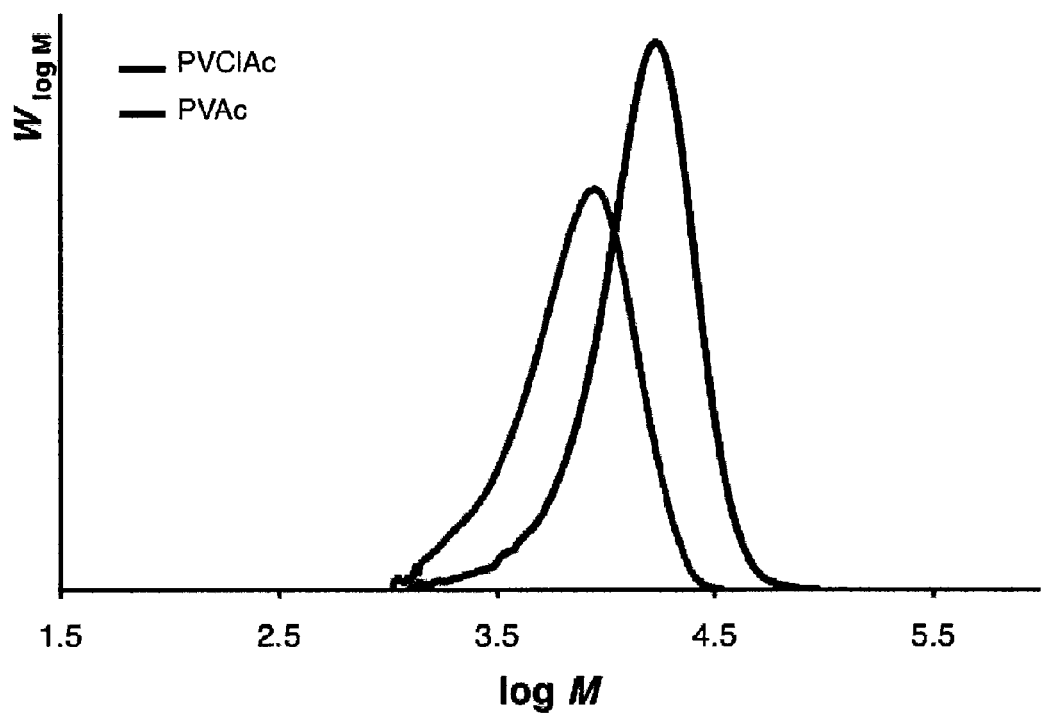
FIG. 5 shows $^1$H NMR of PVTFAc-b-PVAc resulting from trifluoroacetylation of PVA-b-PVAc-5.

After the hydrolysis of PVAc-b-PVClAc-5, PVAc-b-PVA-5 (52.9 mg, 0.344 mmol —OH groups) was treated with trifluoroacetic anhydride (TFAA) (Sigma-Aldrich; 5.00 mL, 35.7 mmol) under nitrogen atmosphere at 30° C. under constant agitation. To ensure complete reaction of the PVA block, dry THF (5.0 mL) was introduced to the reaction after 2.0 h. After 9.0 h, the resulting polymer was isolated by removal of the reaction solvent under vacuo. $^1H$ NMR in acetone-d6 demonstrated complete reaction of the —OH functionalities with the TFAA. $^1H$ NMR: (300.1 MHz, acetone-$d_6$, 22° C.) δ 1.837, 1.984, 2.379, 4.919, 5.1-5.3 (centered at 5.234). See FIG. 5. The replacement of chloroacetate groups with trifluoroacetate groups is evident by comparing the $^1H$ NMR spectra of FIGS. 4 and 5.

Example 6

Selective Hydrolysis of PVClAc Blocks

Vinyl chloroacetate esters of the PVClAc-b-PVAc (EXAMPLE 3) and PVAc-b-PVClAc (EXAMPLE 2) diblock copolymers were removed by selective hydrolysis using K$_2$CO$_3$ in methanol at 22° C. for 3-5 hours. $^1$H NMR spectra of the initial PVAc-b-PVClAc and the resulting PVAc-b-PVA in DMSO-d$_6$ indicate quantitative removal of the vinyl chloroacetate esters (δ 5.10 and 4.09 ppm) with the attendant appearance of new resonances at δ 4.18 ppm, 4.43 ppm, and 4.63 ppm associated with the atactic PVA hydroxyl hydrogens, δ 3.81 ppm associated with the PVA backbone methine hydrogens, and δ 1.40 ppm for the backbone methylene hydrogens. See FIG. 2b. Therefore, selective hydrolysis of these block copolymers is readily achieved under mild conditions to furnish the desired PVAc-b-PVA block copolymer amphiphiles. See Table 3.

TABLE 3

PVAc-b-PVA diblock copolymers from PVAc-b-PVClAc hydrolysis

| Sample[a] | M$_n$ total PVClAc (kg mol−1)[b] | Mol fraction PVClAc | Mol fraction PVa | M$_n$ Total PVA (kg mol−1)[b] |
|---|---|---|---|---|
| PVAc-b-PVA-2 | 19.9 | 0.375 | 0.254 | 12.7 |
| PVA-b-PVAc-3 | 14.2 | 0.461 | 0.390 | 9.54 |
| PVA-b-PVAc-4 | 9.47 | 0.495 | 0.399 | 5.48 |
| PVA-b-PVAc-5 | 14.5 | 0.565 | 0.478 | 7.36 |

[a]Reaction conditions: All reactions were carried out with [chloroacetate ester]:[K$_2$CO$_3$] = 1:4.4 or 1:7 with methanol as solvent at 22° C.
[b]Determined from composition analysis of the parent copolymer by quantitative $^1$H NMR analysis and the absolute M$_n$ (from SEC) of the parent homopolymer block.

Example 7

Verifying Block Copolymer Structure

By treating the PVAc-b-PVA block copolymers with trifluoroacetic anhydride to trifluoroacetylate, it was possible to discern the integrity of the PVAc block and to confirm that random hydrolysis of the acetate esters does not occur. Random deacetylation of the PVAc followed by treatment with trifluoroacetic anhydride is expected to yield random vinyl acetate and vinyl trifluoroacetate comonomer sequences that should have unique $^1$H NMR signatures. The polymer backbone methine region of the $^1$H NMR spectra of the resulting poly(vinyl acetate-b-vinyl trifluoroacetate) (PVAc-b-PVTFAc) in acetone-d6 clearly resolve the methine protons associated with the PVAc block (δ 4.92 ppm) and the PVTFAc block (δ 5.24 ppm), however, with no peaks having intermediate chemical shifts that would arise from vinyl acetate/vinyl trifluoroacetate random copolymer sequences. See FIG. 5. The $^1$H NMR methine hydrogen resonances of the PVTFAc block exhibit three characteristic peaks corresponding to the atactic polymer stereochemistry, indicating that the polymer tacticity is not altered by the trifluoroacetylation reaction. Size exclusion chromatographic analyses of the trilfluoroacetylated polymer using refractive index detection were hampered by the opposite signs of the differential refractive index increments (dn/dc) associated with the two homopolymer blocks of these segmented copolymers, however, in-line viscometry indicates that the PVAC-b-PVTFAc is unimodal.

Example 8

Synthesis of Poly(Vinyl Acetate-b-Vinyl Alcohol-b-Vinyl Acetate) (PVAc-b-PVA-b-PVAc)

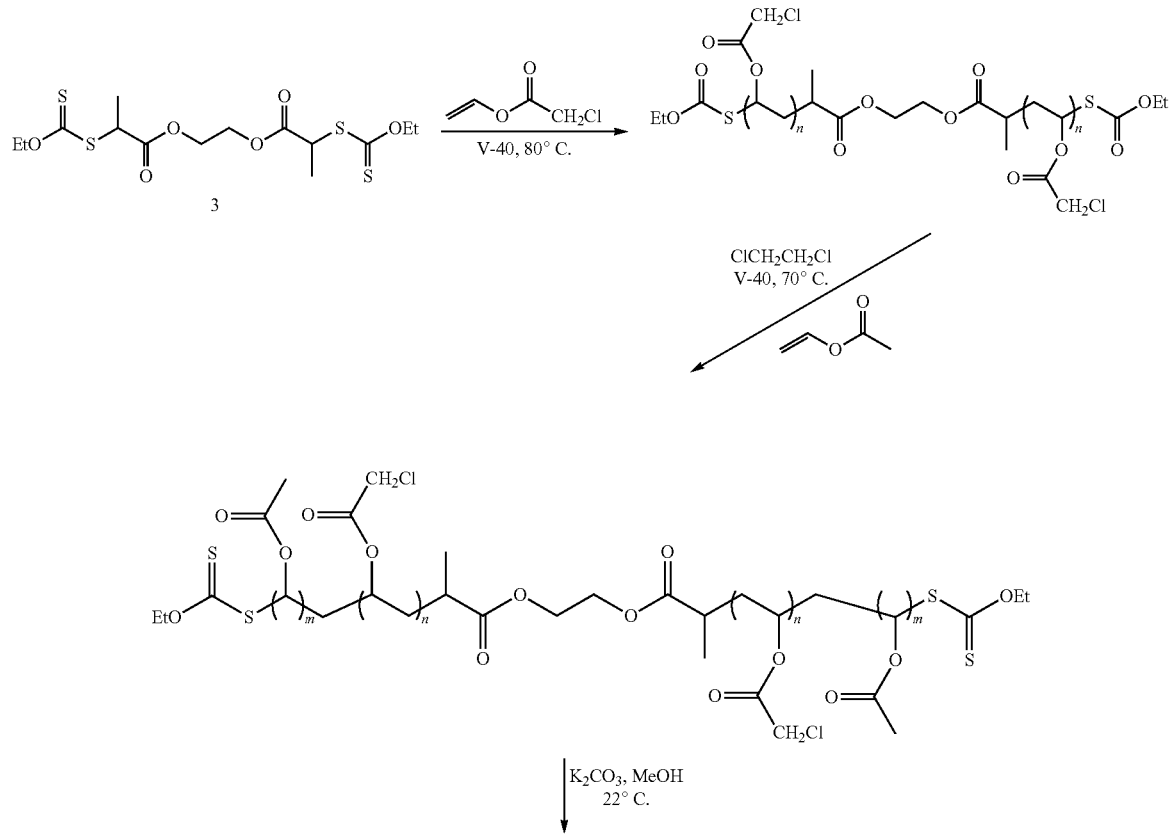

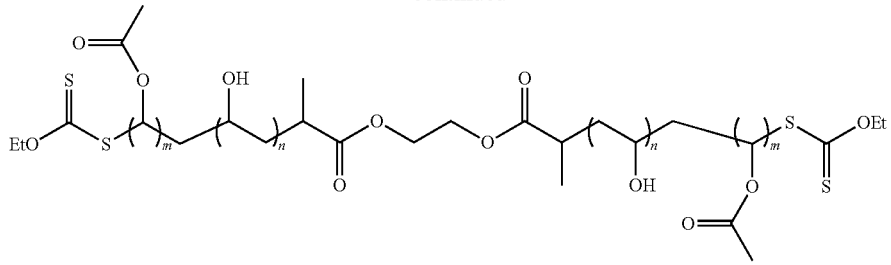

RAFT chain transfer agent (xanthate 3 of Scheme 2) (0.20 g, 0.48 mmol) and V-40 (23.2 mg, 0.09 mmol) were dissolved in 0.10 mL VClAc in a 50 mL round bottom flask. This mixture was degassed by three freeze-pump-thaw cycles and heated to 80° C. in an oil bath. After 4.2 hours, the reaction flask was cooled to room temperature in an ice bath, opened to air, and diluted with THF (20 mL). The resulting polymer solution was precipitated into hexanes (500 mL). Isolated PVClAc polymer was dried under vacuum at 40° C. overnight. Macro-RAFT CTA: $M_{n,SEC}$=12.0 kg/mol, $M_w/M_n$=1.33, 25.5% conversion.

Using macro-RAFT CTA formed above, (0.52 g, 0.04 mmol, Mn=12.0 kg/mol), VAc (4.00 mL, 0.04 mol), DCE (4.00 mL, 0.05 mol), and 0.19 mL of V-40 solution (0.05 M in DCE) were combined in a 100 mL Schlenk tube with [CTA]= 5.3 mM and [CTA]: [V-40]=1:0.22. The reaction was degassed via three freeze-pump-thaw cycles and heated in a 70° C. oil bath. After 12.3 hours, the reaction was cooled to room temperature in an ice bath. The resulting polymer was diluted with THF (20 mL) and precipitated in hexanes (500 mL) to remove both monomer and solvent. The resulting solid was air-dried. PVAc-b-PVClAc-b-PVAc: Calculated $M_{n,NMR}$=19.0 kg/mol, $M_w/M_n$=1.36 (from SEC against PS Standards).

Figure 6:
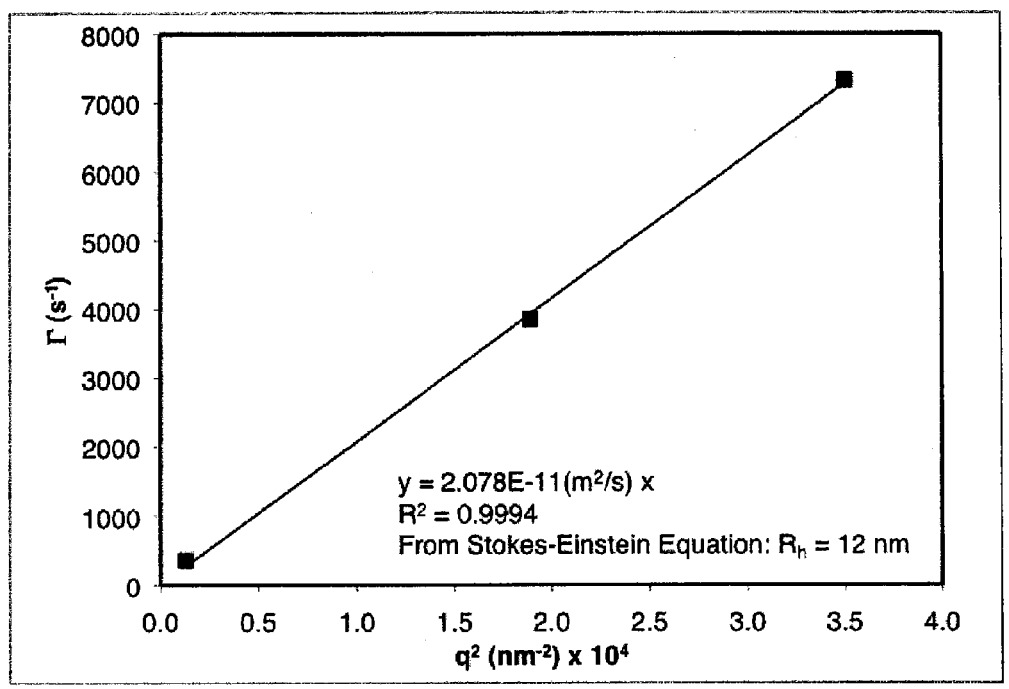
FIG. 6 shows $^1$H-NMR overlay of: (a) PVAc-b-PVClAc-b-PVAc and (b) PVAc-b-PVA-b-PVAc showing the disappearance of peaks characteristic of PVClAc upon treatment with $K_2CO_3$/MeOH and the appearance of peaks associated with PVA, indicating selective hydrolysis of the chloroacetate esters.

Hydroylsis of PVClAc block: PVAc-b-PVClAc-b-PVAc (0.200 g, 6.65×10-3 mmol of VClAc functional groups, $M_n$, overall=19.0 kg/mol, $M_w/M_n$=1.36) was dissolved in methanol (15 mL) for 5 min. $K_2CO_3$ (6.5 mg, 4.70×10$^{-2}$ mmol) was added to the solution and allowed to react for 6.0 h, after which the methanol was removed by rotary evaporation. The product was triturated with distilled water (3×15 mL), centrifuged to isolate the polymer and dried in vacuo at room temperature. Polymer composition was determined by quantitative $^1$H NMR analysis in DMSO-d6. Polymer contained 47.0 mol % vinyl alcohol units with a calculated molecular weight $M_n$, total=10.2 kg/mol based on the $M_n$ of the PVAc blocks from $^1$H NMR. See FIG. 6.

Example 9

Synthesis of Poly(Vinyl Alcohol-b-Vinyl Acetate-b-Vinyl Alcohol) (PVA-b-PVAc-b-PVA)

RAFT chain transfer agent (xanthate 3 of Scheme 2) (0.20 g, 0.48 mmol) and AIBN (16.3 mg, 0.10 mmol) were dissolved in 17.8 mL VAc in a 50 mL round bottom flask. The mixture was degassed by three freeze-pump-thaw cycles and heated to 60° C. in an oil bath. After 1.9 hours, the reaction flask was cooled to room temperature in an ice bath, opened to air, and diluted with THF (20 mL). The resulting macro-RAFT CTA polymer solution was precipitated into hexanes (500 mL). Isolated macro-RAFT CTA polymer was dried under vacuum at 40° C. overnight. Macro-RAFT CTA: $M_n$, SEC=10.3 kg/mol (against polystyrene calibration curve using Mark-Houwink correction), $M_w/M_n$=1.20, 30.5% conversion.

Macro-RAFT CTA (above) (0.53 g, 0.05 mmol, $M_n$=10.3 kg/mol), VClAc (5.00 mL, 0.05 mol), dichloroethane (DCE) (5.00 mL, 0.06 mol), and 0.35 mL of V-40 solution (0.06 M in DCE) were combined in a 100 mL Schlenk tube with [Macro-RAFT CTA]=10.3 mM and [Macro-RAFT CTA]:[V-40]=1: 0.19. The reaction was degassed via three freeze-pump-thaw cycles and heated in a 70° C. oil bath. After 4.5 hours, the reaction was cooled to room temperature in an ice bath. The resulting polymer was diluted with THF (20 mL) and precipitated in hexanes (500 mL) to remove both monomer and solvent. The resulting copolymer was freeze-dried from $C_6H_6$. PVClAc-b-PVAc-b-PVClAc: calculated $M_n$, NMR=15.0 kg/mol, $M_w/M_n$=1.38 (from SEC against PS Standards).

Hydrolysis of thee PVClAc Blocks: PVClAc-b-PVAc-b-PVClAc (74.3 mg, 1.59×10-3 mmol of VClAc functional groups, $M_n$, overall=15.0 kg/mol, $M_w/M_n$=1.38) was dissolved in methanol (10 mL) for 5 min. $K_2CO_3$ (2.2 mg, 1.59×10$^{-2}$ mmol) was added to the solution and allowed to react for 6.0 h, after which the methanol was removed by rotary evaporation. The product was triturated with distilled water (3×15 mL), centrifuged to isolate the polymer and dried in vacuo at room temperature. Polymer composition was determined by quantitative $^1$H NMR analysis in DMSO-d6: Polymer contains 25.2 mol % vinyl alcohol units with a calculated molecular weight $M_n$, total=11.9 kg/mol based on the $M_n$ of the PVAc blocks from $^1$H NMR.

Example 10

Characterization of Micelles from PVAc-b-PVA Copolymers

Block copolymers comprised of hydrophilic PVA and hydrophobic PVAc blocks readily micellize in aqueous solutions to form nanoscale aggregates, which may non-covalently self-assemble into hierarchical structures with unique bulk properties. PVAc-b-PVA-3 (Table 1) (20.0 mg) was dissolved in MeOH (0.3 mL). Under vigorous stirring, deionized water (12.0 mL) was added drop-wise to yield a final solution of 1.0 wt % polymer. This sample was dialyzed against deionized water (800 mL) for 4 days using a RC Spectra/Por (Spectrum Laboratories, Rancho Dominguez, Calif.) with molecular weight cutoff (MWCO) of 6000-8000.

Figure 7:
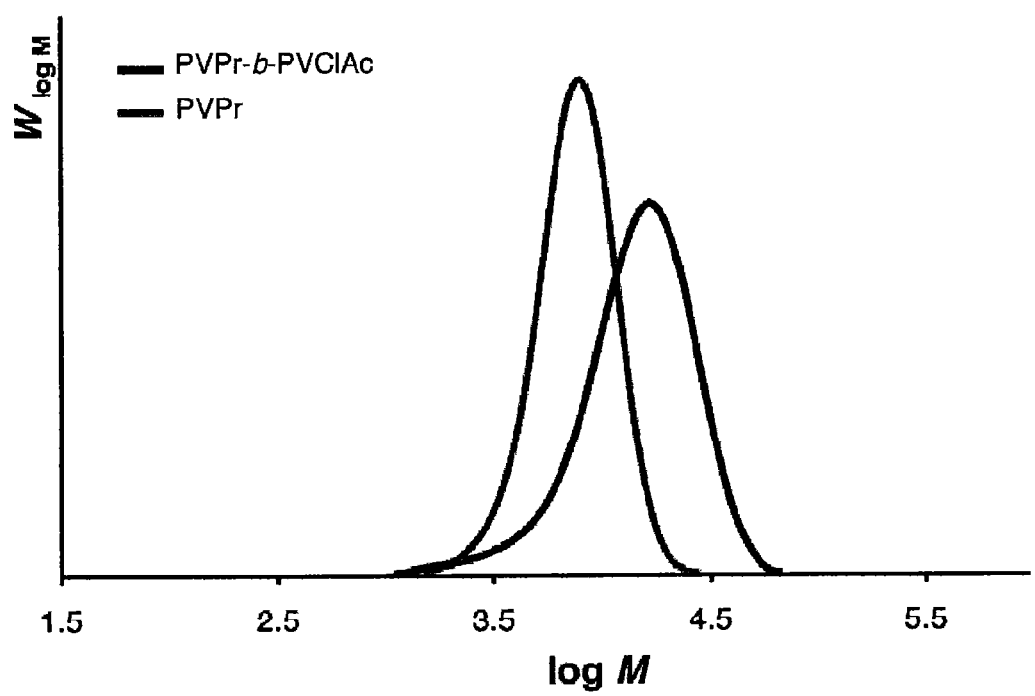
FIG. 7 shows a cryo-TEM image of micelles formed in a 1 wt % aqueous solution of PVA-b-PVAc-3.

The resulting aqueous polymer dispersions were imaged by cryogenic transmission electron microscopy (cryoTEM), which revealed the formation of irregularly shaped micelles which organize into "pearl necklace" chains. A 5 µL droplet of the 1% wt. aqueous micellar solution of the polymer amphiphile was deposited on a lacy carbon-coated copper grid (Ted Pella, Inc., Redding, Calif.) and the samples were placed in a Vitrobot (FEI, Inc., Hillsboro, Oreg.) controlled environment vitrification system and wherein excess solvent was wicked away to create a thin film of the dispersion on the grid surface using a −2 mm blotting offset, a 1 s blot time, and a 15 s drain time to equilibrate stresses in the sample after blotting. The blotted samples were then plunged into liquid ethane (90 K) to vitrify the samples, and then transferred under liquid nitrogen to a Gatan 626 DH cryotransfer specimen holder (Gatan, Inc., Pleasanton, Calif.). The vitreous samples were imaged at −178° C. using a FEI Tecnai G2 F30 tunneling electron microscope (TEM) (FEI, Inc.) operating at 300 kV using a 4096×4096 Ultrascan CCD camera. An exemplary image is shown in FIG. 7.

Example 11

Characterization of Micelles from PVAc-b-PVA Copolymers

Block copolymers comprised of hydrophilic PVA and hydrophobic PVAc blocks readily micellize in aqueous solutions to form nanoscale aggregates, which may non-covalently self-assemble into hierarchical structures with unique bulk properties. PVAc-b-PVA-3 (Table 1) (20.0 mg) was dissolved in dry DMSO (0.3 mL). Under vigorous stirring, deionized water (12.0 mL) was added drop-wise to yield a final solution of 0.2 wt % polymer. This sample was dialyzed against deionized water (800 mL) for 4 days using a RC Spectra/Por (Spectrum Laboratories, Rancho Dominguez, Calif.) with molecular weight cutoff (MWCO) of 6000-8000.

Figure 8:
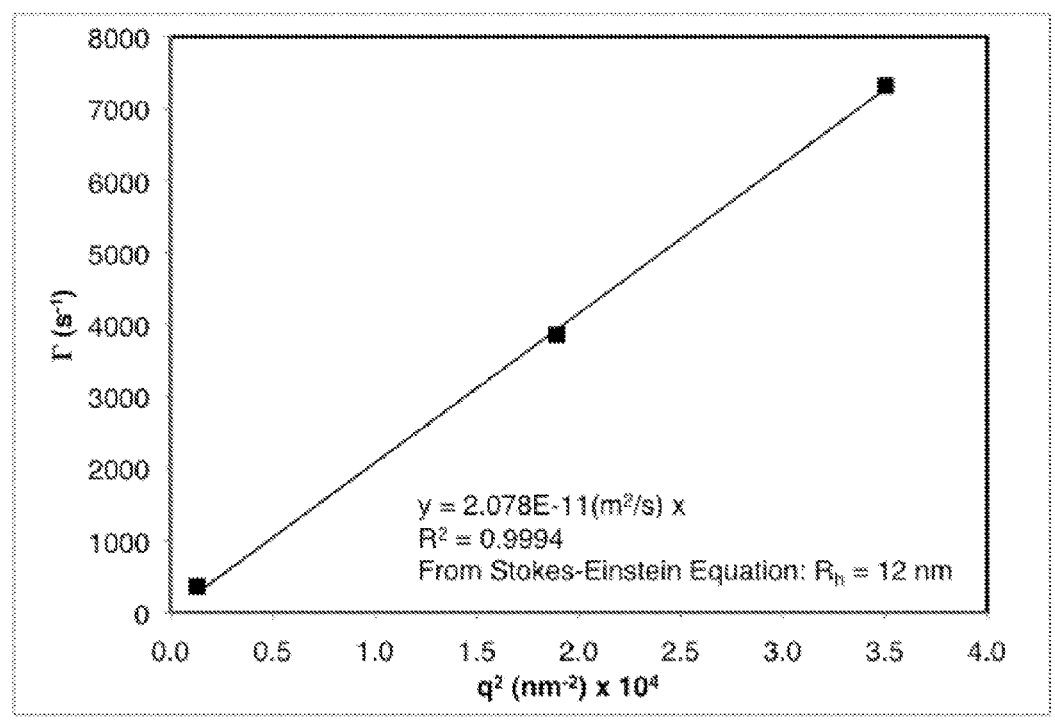
FIG. 8 shows a plot of the relaxation rate as a function of scattering wavevector at 15.7°, 62.6° and 90° to determine the diffusion coefficient for the aggregates of PVAc-b-PVA, which indicates that the hydrodynamic radius of the observed micelles is $R_h$=12 nm.

The micelles were characterized using dynamic light scattering (DLS). Formed micelles were analyzed with a Beckman Coulter N5 Submicron Particle Size Analyzer equipped with an 80 Multi-TAU channel digital correlator and Helium-Neon laser with a wavelength of 632.8 nm (Beckman Coulter, Brea, Calif.). Samples were filtered (0.45 µm pore size) into a dust free glass cuvet. Multi-angle light scattering experiments were conducted at 14.9°, 20.6°, 30.4°, 50.4° and 90.0° and each reported DLS data set represents an average of three independent measurements. Analysis indicates that these block copolymer micelles have a hydrodynamic radius $R_h$=12 nm. The data is shown in FIG. 8.

Prophetic Examples

Example 12

Synthesis of PVAc-b-PVA Copolymer by CMRP

Cobalt(II) acetylacetonate hydrate [$Co(acac)_2 \cdot 2H_2O$], Alfa Aesar, Ward Hill, Mass.] will recrystallized twice from acetone in order to dehydrate the complex followed by scrupulous drying under vacuum to form cobalt(II) acetylacetonate [$Co(acac)_2$]. The dehydrated $Co(acac)_2$ (115.3 mg, 0.448 mmol) will be combined with LUPEROX™ (137 mg, 0.345 mmol; (LUPEROX™, Arkema Inc., Philadelphia, Pa.) as an organic peroxide initiator under nitrogen. In a separate flask, a suspension of freshly distilled vinyl acetate (VAc) (7.9 mL, 85.7 mmol) and citric acid (71.4 mg, 0.372 mmol) (Sigma-Aldrich) will be prepared and degassed by three freeze-pump-thaw cycles. Under a flush of nitrogen, the citric acid/vinyl acetate slurry will be added to the $Co(acac)_2$ and organic peroxide mixture. The reaction mixture will be heated to 30° C. to start the polymerization reaction. After 4.3 h, the VAc polymerization will be stopped by removal from the heating bath and cooling under nitrogen. The product will isolated by removal of the excess VAc under vacuum to yield a cobalt end-capped PVAc homopolymer.

The resulting cobalt end-capped PVAc polymer will be redissolved in degassed, freshly distilled vinyl chloroacetate (VClAc, 10.5 g, 87.1 mmol) and the reaction will be re-heated to 30° C. for 1.45 h to produce a cobalt end-capped PVAc-b-PVClAc diblock copolymer. The polymerization will be cooled to room temperature, stirred with 2,2,6,6-tetramethylpiperidine-N-oxyl (TEMPO, Sigma Aldrich) (138 mg, 0.885 mmol) in 17 mL THF (Sigma Aldrich), and exposed to air. The resulting solution will be poured into 600 mL cold hexanes to precipitate the polymer followed by isolation by vacuum filtration. Vacuum drying the solids will yield a solid PVAc-b-PVClAc copolymer sample. Using size exclusion chromatography, the polydispersity of the resultant PVAc-b-PVClAc will be determined.

PVAc-b-PVClAc (0.10 g) will be dissolved in methanol (5 mL) for 5 min. $K_2CO_3$ (2.1 mg, $1.52 \times 10^{-2}$ mmol) will be added to the solution and allowed to react for 3.5 h, after which the methanol will be removed by rotary evaporation. The product will be triturated with distilled water (15 mL×3), centrifuged to isolate the polymer and dried in vacuo at room temperature. $^1$H NMR in DMSO will be used to assess the complete hydrolysis of the chloroacetate esters.

Example 13

Synthesis of PVAc-b-PVA Copolymer with BIRP

Thoroughly deoxygenated vinyl acetate (VAc, 10 g, 112 mmol), freshly distilled from $NaBH_4$ prior to use, will be combined with methyl 2-(dimethylbismuthanyl) isobutrate (76.2 mg, 0.224 mmol) and AIBN (7.4 mg, 0.045 mmol) under a nitrogen atmosphere. This mixture, will be heated to 60° C. for 4 hours. The reaction will then be cooled and the excess VAc monomer will be completely removed under vacuum to yield a bismuth end-capped PVAc homopolymer.

This bismuth end-capped PVAc will be redissolved in vinyl chloroacetate (VClAc, 16.30 g, 135 mmol), freshly distilled from $NaBH_4$, and this mixture will be heated to 60° C. under nitrogen for 8 h to yield a bismuth end-capped PVAc-b-PVClAc block copolymer. The reaction solution will be poured into 600 mL cold hexanes to precipitate the polymer followed by isolation by vacuum filtration. Vacuum drying the solids will yield a solid PVAc-b-PVClAc copolymer sample. Using size exclusion chromatography, the polydispersity of the resultant PVAc-b-PVClAc will be determined.

PVAc-b-PVClAc (0.10 g) will be dissolved in methanol (5 mL) for 5 min. $K_2CO_3$ (2.1 mg, $1.52 \times 10^{-2}$ mmol) will be added to the solution and allowed to react for 3.5 h, after which the methanol will be removed by rotary evaporation. The product will be triturated with distilled water (15 mL×3), centrifuged to isolate the polymer and dried in vacuo at room temperature. $^1$H NMR in DMSO will be used to assess the complete hydrolysis of the chloroacetate esters.

Example 14

Synthesis of PVAc-b-PVA-b-PVAc Copolymer Using BIRP

Thoroughly deoxygenated vinyl acetate (VAc, 10 g, 112 mmol), freshly distilled from $NaBH_4$ prior to use, will be combined with methyl 2-(dimethylbismuthanyl) isobutrate (76.2 mg, 0.224 mmol) and AIBN (7.4 mg, 0.045 mmol) under a nitrogen atmosphere. This mixture will be heated to 60° C. for 4 hours. The reaction will then be cooled and the excess VAc monomer will be completely removed under vacuum to yield a bismuth end-capped PVAc homopolymer.

This bismuth end-capped PVAc will be redissolved in vinyl chloroacetate (VClAc, 16.30 g, 135 mmol), freshly distilled from NaBH$_4$, and this mixture will be heated to 60° C. under nitrogen for 8 h to yield a bismuth end-capped PVAc-b-PVClAc block copolymer. The reaction will then be cooled and the excess VClAc monomer will be completely removed under vacuum to yield a bismuth end-capped PVAc-b-PV-ClAc diblock copolymer.

The bismuth end-capped PVAc-b-PVClAc diblock copolymer will be redissolved in freshly distilled VAc (10 g, 112 mmol) and 1,2-dichloroethane (10 mL), and this mixture will be heated to 60° C. under nitrogen for 8 h to yield a bismuth end-capped PVAc-b-PVClAc-b-PVAc triblock copolymer. The reaction will be stopped by cooling to room temperature. The reaction solution will be poured into 600 mL cold hexanes to precipitate the polymer followed by isolation by vacuum filtration. Vacuum drying the solids will yield a solid PVAc-b-PVClAc-b-PVAc copolymer sample. Using size exclusion chromatography, the polydispersity of the resultant PVAc-b-PVClAc-PVAc will be determined.

PVAc-b-PVClAc-b-PVAc (0.10 g) will be dissolved in methanol (5 mL) for 5 min. K$_2$CO$_3$ (2.1 mg, 1.52×10$^{0.2}$ mmol) will be added to the solution and allowed to react for 3.5 h, after which the methanol will be removed by rotary evaporation. The resulting PVAc-b-PVA-b-PVAc will be triturated with distilled water (15 mL×3), centrifuged to isolate the polymer and dried in vacuo at room temperature. $^1$H NMR in DMSO will be used to assess the complete hydrolysis of the chloroacetate esters.

Example 15

Synthesis of PVAc-b-PVA Copolymer by RAFT Polymerization of Vinyl Fluoroacetate

Using the method of Example 2, a PVPr macro-RAFT agent will be prepared. The resulting PVAc macro-RAFT agent will be redissolved in a mixture of 1,2-dichloroethane as a solvent, vinyl fluoroacetate (VFAc), and V-40. The solution will be sealed in a flask, degassed by three freeze-pump-thaw cycles, and placed in an oil bath at 80° C. After 6.0 h, the reaction will be removed from the oil bath and cooled under running water to terminate the reaction. The reaction solution will be poured into 600 mL cold hexanes to precipitate the polymer followed by isolation by vacuum filtration. Vacuum drying the solids will yield a solid PVAc-b-PVFAc copolymer sample. Using size exclusion chromatography, the polydispersity of the resultant PVAc-b-PVFAc will be determined.

PVAc-b-PVFAc (0.10 g) will be dissolved in methanol (5 mL) for 5 min. K$_2$CO$_3$ (2.1 mg, 1.52×10$^{-2}$ mmol) will be added to the solution and allowed to react for 3.5 h, after which the methanol will be removed by rotary evaporation. The resulting PVAc-b-PVA will be triturated with distilled water (15 mL×3), centrifuged to isolate the polymer and dried in vacuo at room temperature. $^1$H NMR in DMSO will be used to assess the complete hydrolysis of the fluoroacetate esters.

Thus, the invention provides, among other things, poly(vinyl ester)-poly(vinyl alcohol) copolymers and poly(vinyl ester)-poly(vinyl haloalkanoate) copolymers and methods of making poly(vinyl ester)-poly(vinyl alcohol) copolymers and poly(vinyl ester)-poly(vinyl haloalkanoate) copolymers. Various features and advantages of the invention are set forth in the following claims.

The invention claimed is:

1. A copolymer comprising a block of poly(vinyl haloalkanoate) and a block of poly(vinyl ester), the block of poly(vinyl haloalkanoate) comprising repeating units of

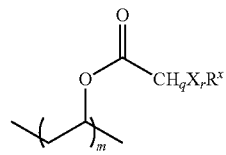

wherein X is fluorine or chlorine, q is 0 or 1, r is 2–q, R$^x$ is H, F, Cl, CH$_3$ or (CH$_2$)$_t$CH$_3$, t is 1 to 16, and m is 10 to 12,000; and the block of poly(vinyl ester) comprises repeating units of

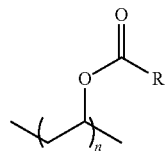

wherein R is H, C$_1$-C$_{22}$ straight or branched alkyl or alkylhalide, or phenyl or substituted phenyl, and n is 10 to 12,000, wherein the repeating poly(vinyl haloalkanoate) units are not the same as the polyvinyl ester units.

2. The copolymer of claim 1, wherein the block of poly(vinyl ester) comprises repeating units selected from the group consisting of vinyl acetate (VAc), vinyl pivalate (VPv), vinyl benzoate (VBz), vinyl propionate (VPr), vinyl butyrate (VBut), vinyl stearate (VSt), vinyl chloroacetate (VClAc), vinyl dichloroacetate, vinyl trichloroacetate, vinyl fluoroacetate, vinyl difluoroacetate, vinyl trifluoroacetate, and vinyl 2-chloropropionate.

3. The copolymer of claim 1, wherein the block of poly(vinyl ester) comprises vinyl benzoate repeating units having phenyl groups substituted with halo, hydroxy, or amino.

4. The copolymer of claim 1, wherein the copolymer is a diblock copolymer.

5. The copolymer of claim 1, wherein the copolymer comprises three blocks.

6. The copolymer of claim 1, wherein the copolymer comprises four blocks.

7. The copolymer of claim 1, wherein the copolymer comprises five blocks.

8. The copolymer of claim 1, wherein the copolymer is linear.

9. The copolymer of claim 1, wherein the copolymer is branched.

* * * * *